United States Patent
Arai et al.

(10) Patent No.: US 6,803,422 B2
(45) Date of Patent: *Oct. 12, 2004

(54) CROSS-COPOLYMERIZED OLEFIN/ AROMATIC VINYL COMPOUND/DIENE COPOLYMER AND PROCESS FOR ITS PRODUCTION

(75) Inventors: Toru Arai, Machida (JP); Toshiaki Otsu, Machida (JP); Masataka Nakajima, Machida (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 29 days.

This patent is subject to a terminal disclaimer.

(21) Appl. No.: 10/078,668

(22) Filed: Feb. 21, 2002

(65) Prior Publication Data

US 2002/0161130 A1 Oct. 31, 2002

Related U.S. Application Data

(63) Continuation-in-part of application No. 09/831,358, filed as application No. PCT/JP00/06284 on Sep. 13, 2000, now Pat. No. 6,566,453.

(30) Foreign Application Priority Data

| Sep. 13, 1999 | (JP) | 11-258618 |
|---|---|---|
| Jun. 20, 2000 | (JP) | 2000-184053 |
| Feb. 21, 2001 | (JP) | 2001-047715 |
| Jul. 23, 2001 | (JP) | 2001-221247 |

(51) Int. Cl.⁷ .................... C08F 279/00; C08F 4/00; C08F 4/72
(52) U.S. Cl. ................. 525/244; 525/243; 525/245; 525/248; 525/256; 525/268; 526/170; 526/347
(58) Field of Search ................. 525/243, 244, 525/245, 248, 256, 268; 526/170, 347

(56) References Cited

U.S. PATENT DOCUMENTS

| 5,037,890 | A | 8/1991 | Yokohama et al. |
|---|---|---|---|
| 5,332,788 | A | 7/1994 | Yokoyama et al. |
| 5,608,009 | A | 3/1997 | Machida et al. |
| 5,869,591 | A | 2/1999 | McKay et al. |
| 5,883,213 | A | 3/1999 | Arai et al. |
| 6,066,709 | A | 5/2000 | Arai et al. |
| 6,096,849 | A | 8/2000 | Chung et al. |
| 6,147,180 | A | 11/2000 | Markel et al. |
| 6,235,855 | B1 | 5/2001 | Jessell et al. |
| 6,248,850 | B1 | 6/2001 | Arai et al. |
| 6,265,493 | B1 | 7/2001 | Chung et al. |
| 6,329,479 | B1 | 12/2001 | Arai et al. |
| 6,348,556 | B1 | 2/2002 | Arai et al. |
| 6,414,102 | B2 | 7/2002 | Chung et al. |
| 6,552,148 | B1 | 4/2003 | Cheung et al. |
| 6,566,453 | B1 * | 5/2003 | Arai et al. ............. 525/244 |
| 2003/0120012 | A1 | 6/2003 | Cheung et al. |

FOREIGN PATENT DOCUMENTS

| EP | 0 911 346 | 4/1999 |
|---|---|---|
| EP | 0 923 617 B1 | 8/2003 |
| JP | 5-262817 | 10/1993 |
| JP | 2000-38420 | 2/2000 |
| WO | WO000/49059 | 8/2000 |
| WO | WO 01/19881 | 3/2001 |
| WO | WO02/072692 A1 | 9/2002 |

* cited by examiner

*Primary Examiner*—James J. Seidleck
*Assistant Examiner*—Olga Asinovsky
(74) *Attorney, Agent, or Firm*—Oblon, Spivak, McClelland, Maier & Neustadt, P.C.

(57) ABSTRACT

A highly uniform vinyl compound polymer-cross-copolymerized olefin/styrene/diene copolymer excellent in processability, mechanical properties, high temperature properties, compatibility and transparency, and its composition and a process for its production, are provided. This copolymer is a crossed polymer obtained by cross-copolymerizing an olefin/styrene/diene copolymer having a styrene content of from 0.03 mol % to 96 mol %, a diene content of from 0.0001 mol % to 3 mol % and the rest being an olefin, with an olefin/aromatic vinyl compound copolymer.

25 Claims, 10 Drawing Sheets

Cross copolymer

Graft copolymer

Relation between styrene content and Vicat softening point

- ◆ Cross-copolymer (Example)
- ■ Ethylene/styrene copolymer (Comparative Example)
- ▲ Ethylene/styrene copolymer blend (Comparative Example)

CROSS-COPOLYMERIZED OLEFIN/ AROMATIC VINYL COMPOUND/DIENE COPOLYMER AND PROCESS FOR ITS PRODUCTION

This is a continuation-in-part application of the application Ser. No. 09/831,358 having a filing date of May 14, 2001 now U.S. Pat. No. 6,566,453.

BACKGROUND OF THE INVENTION

1. Field of the Invention

The present invention relates to a novel cross-copolymerized olefin/aromatic vinyl compound/diene copolymer (hereinafter sometimes abbreviated as a cross-copolymer) and its composition, and further processes for their production.

2. Discussion of Background

Ethylene/Aromatic Vinyl Compound (Styrene) Copolymers

Some ethylene/aromatic vinyl compound (styrene) random copolymers obtainable by means of a so-called uniform type Ziegler-Natta catalyst system comprising a transition metal catalyst component and an organic aluminum compound, and processes for their production, are known.

JP-A-3-163088 and JP-A-7-53618 disclose ethylene/styrene copolymers having a styrene content of at most 50 mol % and containing no normal (i.e. head-to-tail) styrene chain, so-called pseudo-random copolymers, obtainable by means of a complex having a so-called constrained geometric structure.

JP-A-6-49132 and Polymer Preprints, Japan, 42, 2292 (1993) disclose processes for producing similar ethylene/styrene copolymers having an aromatic vinyl compound content of at most 50 mol % and containing no normal aromatic vinyl compound chain, i.e. pseudo-random copolymers, by means of a catalyst comprising a crosslinked metallocene type Zr complex and a cocatalyst. These copolymers have no stereoregularity derived from aromatic vinyl compound units.

Further, recently, it has been reported to produce an ethylene/aromatic vinyl compound copolymer having a stereoregularity of alternating copolymerization type by means of a certain specific crosslinked bisindenyl type Zr complex i,e. a racemic[ethylenebis(indenyl)zirconium dichloride] under an extremely low temperature (−25° C.) condition. (Macromol. Chem., Rapid Commun., 17, 745 (1996).) However, with the copolymer obtainable by this complex, the molecular weight is not yet practically sufficient, and the compositional distribution is also large.

Further, JP-A-9-309925 and JP-A-11-130808 disclose novel ethylene/styrene copolymers which respectively have styrene contents of from 1 to 55 mol % and from 1 to 99 mol % and which have ethylene/styrene alternating structures and isotactic stereoregularity in their styrene chain structures and further have head-to-tail styrene chain structures, with the alternating degrees (λ values in this specification) of the copolymers being at most 70. Further, these copolymers have high transparency.

The physical properties of various ethylene/styrene random copolymers mentioned above, are strongly influenced by the compositions (the styrene contents) when their molecular weights are sufficiently high. Namely, a copolymer having a relatively low styrene content at a level of at most 20 mol %, has crystallizability based on the polyethylene chains, whereby it may have heat resistance at a level of from 80° C. to 120° C. and further has high mechanical properties. However, if the styrene content becomes higher, the crystallizability derived form the polyethylene chains tends to decrease or diminish, and the heat resistance and mechanical properties tend to decrease. When there is stereoregularity in ethylene/styrene alternating structures, and relatively many such alternating structures are contained, the crystallizability derived from such alternating structures will appear, but there may sometimes be a problem with respect to the crystallinity or the crystallization rate. In a copolymer having a high styrene content of at least 60 mol %, many isotactic styrene chain structures are contained, but isotactic styrene chains have a low crystallization rate, whereby it may lack in practical applicability as a heat resistant resin.

On the other hand, a copolymer having a low styrene content is excellent also in cold resistance (embrittle temperature) at a level of −60° C. However, as the styrene content increases, the cold resistance tends to deteriorate, and in the vicinity of 30 mol %, it will be about −10° C., and in the vicinity of 50 mol %, it will be about room temperature.

A copolymer having a styrene content of from about 15 to 50 mol %, has a feeling, flexibility and stress relaxation property similar to polyvinyl chlorides and is useful as a substitute for polyvinyl chlorides. Further, it is excellent in vibration-damping properties and soundproofing properties. However, its heat resistance and cold resistance are poor, whereby it is hardly useful by itself.

When used as a stretch film, a copolymer having a styrene content of from about 30 to 50 mol % shows slow elongation recovery properties similar to a polyvinyl chloride stretch film at room temperature, but it tends to be too stiff under a refrigerating or freezing condition. Further, when it is attempted to produce this film by inflation molding or extrusion molding with a T-die, the film itself has a high self-tack property, and during winding, the film tends to adhere to itself. A self-tack property to some extent is effective for a substitute for a polyvinyl chloride film, especially as a stretch film for food packaging, but it can hardly be compatible with film moldability.

An ethylene/styrene copolymer having a styrene content of at least 40 mol % is excellent in printability and tinting property and has an improved compatibility with a styrene type resin. Especially, a copolymer having a styrene content of at most 20 mol % is interior in printability and tinting property, but is excellent in compatibility with a polyolefin type resin.

These random ethylene/styrene copolymers show remarkable changes in the physical properties and compatibility depending upon the compositions as described above, and they have had a problem that with a single composition, various properties (such as heat resistance, cold resistance and stress relaxation property or flexibility) can not be satisfied at the same time.

In order to solve such a problem, it has been proposed to mix ethylene/styrene copolymers having different compositions to obtain a composition (JP-A-2000-129043, WO98/10018), to mix them with polyolefins to obtain compositions (WO98/10015), or to crosslink them (U.S. Pat. No. 5,869, 591). However, ethylene/styrene copolymers substantially different in their compositions have poor compatibility to one another, and their compositions or compositions with polyolefins tend to be opaque, and the mechanical properties may sometimes be impaired, whereby the application may be limited. Further, in the case of crosslinking, there is a problem that the secondary moldability or recycling property tends to be lost, or the production cost tends to increase.

Ethylene/α-Olefin Copolymers

Ethylene/α-olefin copolymers, in which 1-hexene, 1-octene or the like is co-polymerized to ethylene, i.e. so-called LLDPE, are flexible and transparent and have high strength, whereby they are widely used as e.g. films for general use, packaging materials or containers. However, as a nature of polyolefin type resins, their printability and coating properties are low, and special treatment such as corona treatment will be required for printing or coating. Further, they have poor affinity with an aromatic vinyl compound polymer such as a polystyrene or a polar polymer, and in order to obtain a composition with such a resin having good mechanical properties, it has been necessary to employ an expensive compatibilizing agent additionally.

Common Graft Copolymers

As a method for obtaining a graft copolymer, a method has been heretofore known wherein a graft copolymer of an olefin type polymer or an olefin/styrene type copolymer is obtained during the polymerization or during the mold processing by a common known radical graft treatment. However, by this method, it has been difficult to obtain high graft efficiency, and the method is disadvantageous from the viewpoint of costs. Further, the obtainable graft copolymer usually has a problem that it is non-uniform and partially gelled to be not melting, whereby the moldability tends to be impaired. The graft copolymer thus obtained, usually has graft chains independently branched from the polymer main chain, but when such copolymer is employed as a composition or a compatibilizing agent, the strength of the interface of the polymer microstructure can not be said to be sufficient.

SUMMARY OF THE INVENTION

The present invention is firstly to solve the foregoing problems of the prior art and to provide a cross-copolymerized olefin/aromatic vinyl compound/diene copolymer which satisfies heat resistance and various mechanical properties, processability, compatibility and transparency, and its composition and an industrially excellent process for producing such a cross-copolymer.

The present invention is secondly to provide as applications of the cross-copolymer of the present invention, various resin compositions or molded products containing the cross-copolymer, which have the above-mentioned problems of various resin compositions or molded products solved or improved.

DISCLOSURE OF THE INVENTION

Cross-Copolymerized Olefin/Aromatic Vinyl Compound/Diene Copolymer (a Cross-Copolymer)

In this specification, an aromatic vinyl compound content of a copolymer represents a content of units derived from an aromatic vinyl compound monomer, contained in the copolymer. An olefin content and a diene content likewise represent contents of the respective monomer units.

The cross-copolymer of the present invention is a cross-copolymerized olefin/aromatic vinyl compound/diene copolymer characterized in that it is obtained by cross-copolymerizing an olefin/aromatic vinyl compound/diene copolymer having an aromatic vinyl compound content of from 0.03 mol % to 96 mol %, a diene content of from 0.0001 mol % to 3 mol % and the rest being an olefin, with an olefin/aromatic vinyl compound copolymer (which may contain a diene) having an aromatic vinyl compound content which is different by at least 5 mol %.

Further, the cross-copolymer of the present invention is a copolymer (which will be referred to as a cross-copolymerized olefin/aromatic vinyl compound/diene copolymer or simply as a cross-copolymer) obtained by synthesizing an olefin/aromatic vinyl compound/diene copolymer having an aromatic vinyl compound content of from 0.03 mol % to 96 mol %, a diene content of from 0.0001 mol % to 3 mol % and the rest being an olefin (main chain), followed by cross-copolymerizing an olefin/aromatic vinyl compound copolymer having an aromatic vinyl compound content of from 0 mol % to 96 mol % and the rest being an olefin, preferably an aromatic vinyl compound content of from 0.03 mol % to 96 mol % and the rest being an olefin, wherein the aromatic vinyl compound content is different by at least 5 mol %.

Further, the cross-copolymer of the present invention is a cross-copolymerized olefin/aromatic vinyl compound/diene copolymer characterized in that it is obtained by using an olefin/aromatic vinyl compound/diene copolymer having an aromatic vinyl compound content of from 0.03 mol % to 96 mol %, a diene content of from 0.0001 mol % to 3 mol % and the rest being an olefin, and cross-copolymerizing it, wherein the aromatic vinyl compound content is different by at least 2 mol % as compared with the olefin/aromatic vinyl compound/diene copolymer prior to the cross-copolymerization.

Further, preferably, the cross-copolymer of the present invention is a cross-copolymerized olefin/aromatic vinyl compound/diene copolymer characterized in that it is obtained by cross-copolymerizing an olefin/aromatic vinyl compound/diene copolymer having an aromatic vinyl compound content of from 0.03 mol % to 96 mol %, a diene content of from 0.0001 mol % to 3 mol % and the rest being an olefin, with an olefin (co)polymer or an olefin/aromatic vinyl compound copolymer (which may contain a diene), wherein the aromatic vinyl compound content is different by at least 2 mol %, preferably at least 5 mol %, as compared with an olefin/aromatic vinyl compound/diene copolymer prior to the cross-copolymerization.

The cross-copolymer of the present invention may finally have a composition such that the aromatic vinyl compound content is from 0.03 mol % to 96 mol %, the diene content is from 0.0001 mol % to 3 mol %, and the rest being an olefin, preferably a composition such that the aromatic vinyl compound content is from 5 mol % to 96 mol %, the diene content is from 0.0001 mol % to 3 mol %, and the rest being an olefin.

The weight average molecular weight of the cross-copolymer of the present invention is at least 10,000, preferably at least 30,000, particularly preferably at least 60,000, and at most 1,000,000, preferably at most 500,000. The molecular weigh distribution (Mw/Mn) is not particularly limited, but is usually at most 10, preferably at most 7, most preferably at most 5, and at least 1.5.

Further, in the specification of the present invention, the cross-copolymer is a polymer which can directly be obtained by the process of the present invention.

DETAILED DESCRIPTION OF THE PREFERRED EMBODIMENTS

Figure 1:
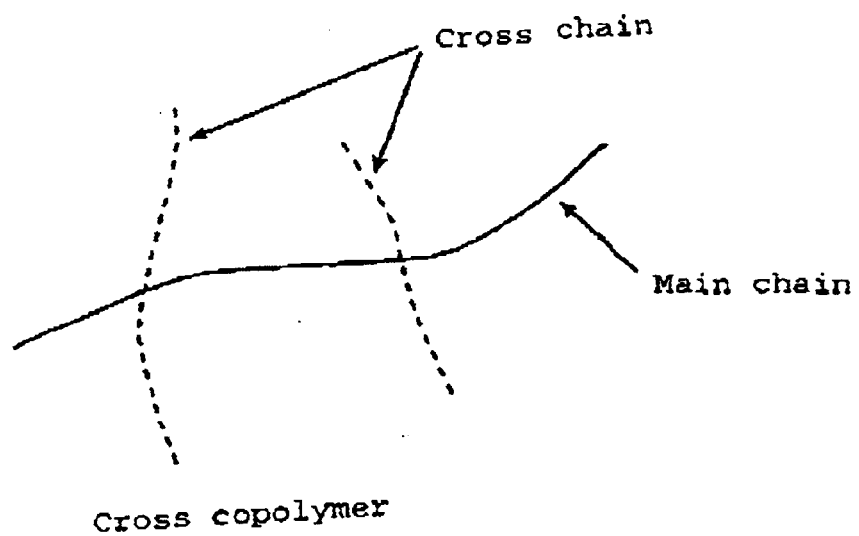
FIG. 1 is a schematic view illustrating the cross-copolymer of the present invention.

Further, the present invention is a cross-copolymer constituted preferably by the structure shown in FIG. 1 or comprising the structure shown in FIG. 1.

Figure 2:
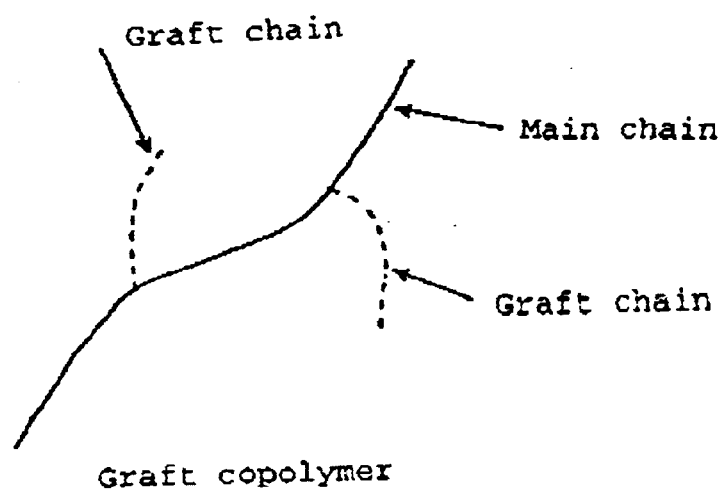
FIG. 2 is a schematic view illustrating a conventional grafted copolymer.

Namely, as shown in FIG. 1, it is a copolymer having mainly a structure in which a main chain olefin/aromatic vinyl compound/diene copolymer is bonded (cross-bonded or intersectingly bonded) with cross chains, at one point or plural points, via diene units. Such a cross-structure may be rephrased as a star structure. Further, in the classification by the POLY division of the American Chemical Society, it is called a segregated star copolymer (Polymer Preprints, 1998, March). In the description of the present invention, the olefin/aromatic vinyl compound copolymer or olefin (co) polymer cross-bonded to the main chain olefin/aromatic vinyl compound/diene copolymer will be referred to as a cross chain.

whereas as shown in FIG. 2, a graft copolymer known to those skilled in the art is a copolymer having mainly polymer chains branched from one point or plural points of the main chain.

With a structure such that a polymer main chain is cross-bonded (intersectingly bonded) with other polymer chains (which may be called also as a star structure), when it is employed as a composition or compatibilizing agent, it is usually believed to show superior strength of the interface of the polymer microstructure and present high mechanical properties, as compared with a grafted structure.

Preferably, the cross-copolymer of the present invention has characteristics such that at least one melting point by DSC is observed at a level of from 80° C. to 140° C., preferably from 95° C. to 140° C., and its heat of crystal fusion is at least 10 J/g and at most 150 J/g, preferably at least 20 J/g and at most 120 J/g. The crystal structure to give such heat of crystal fusion is preferably a crystal structure based on an ethylene chain structure. This crystal structure can be ascertained by a known method such as an X-ray diffraction method.

Further, the cross-copolymer of the present invention is a cross-copolymerized olefin/aromatic vinyl compound/diene copolymer, characterized in that it has an aromatic vinyl compound content of from 5 mol % to 50 mol %, a diene content of from 0.0001 mol % to 3 mol % and the rest being ethylene or at least two types of olefins including ethylene, and it has a crystal structure derived from an ethylene chain structure, wherein the aromatic vinyl compound content and at least one of the melting point such that the heat of crystal fusion as measured by DSC is at least 10 J/g and at most 150 J/g, satisfies the following relation:

$(5 \leq St \leq 15)\ -3 \cdot St + 125 \leq Tm \leq 140$ $(15 < St \leq 50)\ 80 < Tm \leq 140$ where Tm is the melting point (° C.) such that the heat of crystal fusion is at least 10 J/g and at most 150 J/g, and St is the aromatic vinyl compound content (mol %).

Further preferably, the cross-copolymer of the present invention is a cross-copolymerized olefin/aromatic vinyl compound/diene copolymer, characterized in that it has an aromatic vinyl compound content of from 5 mol % to 15 mol %, a diene content of from 0.0001 mol % to 3 mol % and the rest being ethylene or at least two types of olefins including ethylene, wherein the aromatic vinyl compound content and the melting point such that the heat of crystal fusion as measured by DSC is at least 10 J/g and at most 150 J/g, satisfy the following relation:

$(5 \leq St \leq 10)\ -3 \cdot St + 125 \leq Tm \leq 140$ $(10 < St \leq 15)\ 95 < Tm \leq 140$ where Tm is the melting point (° C.) such that the heat of crystal fusion is at least 10 J/g and at most 150 J/g, and St is the aromatic vinyl compound content (mol %).

Further preferably, it is a cross-copolymerized olefin/aromatic vinyl compound/diene copolymer which has a single melting point as observed by DSC and the melting point of which satisfies the above-mentioned relation.

Further, the cross-copolymer of the present invention is a cross-copolymerized olefin/aromatic vinyl compound/diene copolymer, characterized in that it has an aromatic vinyl compound content of from 5 mol % to 20 mol %, a diene content of from 0.0001 mol % to 3 mol % and the rest being ethylene or at least two types of olefins including ethylene, wherein the aromatic vinyl compound content and the Vicat softening point satisfy the following relation;

$(5 \leq St \leq 20)\ -3 \cdot St + 120 \leq T\ vicat \leq 140$ where T vicat is the Vicat softening point (° C.), and St is the aromatic vinyl compound content (mol %).

Further preferably, it is a cross-copolymerized olefin/aromatic vinyl compound/diene copolymer, characterized in that it has an aromatic vinyl compound content of from 5 mol % to 15 mol %, a diene content of from 0.0001 mol % to 3 mol % and the rest being ethylene or at least two types of olefins including ethylene, wherein the aromatic vinyl compound content and the Vicat softening point satisfy the following relation:

$(5 \leq St \leq 15)\ -3 \cdot St + 120 \leq T\ vicat \leq 140$ where T vicat is the Vicat softening point (° C.), and St is the aromatic vinyl compound content (mol %).

Among cross-copolymers of the present invention, a cross-copolymerized ethylene/styrene/divinylbenzene copolymer can have at least one glass transition point within a range of from −30° C. to −15° C. The glass transition point is a glass transition point obtained by a tangent method (on set method) in the DSC measurement.

In a molded sheet product of 1 mm, the cross-copolymerized olefin/aromatic vinyl compound/diene copolymer of the present invention, may have a haze of at most 30%, preferably at most 20%.

In a heat molded product of 1 mm, the cross-copolymerized olefin/aromatic vinyl compound/diene copolymer of the present invention may have a total light transmittance of at least 70%, preferably at least 80%.

Further, the present invention is a cross-copolymerized olefin/aromatic vinyl compound/diene compound excellent in processability, of which MFR as measured under a load of 5 kg at 200° C. is at least 0.02 g/10 min., preferably at least 0.2 g/10 min. and at most 100 g/10 min., more preferably MFR as measured under a load of 5 kg at 230° C. is at least 1.0 g/10 min and at most 50 g/10 min.

Further, the present invention is a cross-copolymerized olefin/aromatic vinyl compound/diene copolymer containing a small gel content or substantially no gel content, whereby the boiling xylene insoluble (the gel content) obtained by ASTM D-2765-84 is less than 10 weight %, preferably less than 1 weight %, most preferably less than 0.1 weight %, of the entirety.

The present invention is preferably a cross-copolymerized olefin/aromatic vinyl compound/diene copolymer, wherein the olefins is ethylene or at least two types of olefins including ethylene.

Further, the cross-copolymer of the present invention is a copolymer which can be obtained by the following process.

The cross-copolymer of the present invention includes not only a concept representing the cross-copolymer itself but also a concept of a composition containing the cross-copolymer and an olefin/aromatic vinyl compound copolymer not-crossed, which is obtainable in the first polymerization step and the second or subsequent polymerization step (which may sometimes be hereinafter referred to as a second polymerization step) at an optional ratio. Such a composition containing a cross-copolymer can be obtained by the process of the present invention.

The cross-copolymer of the present invention has different contents of vinyl aromatic compound in the main chain and in the cross chains, so that if it contains olefin/aromatic vinyl compound copolymers with different compositions (aromatic vinyl compound contents), which are obtainable in the respective polymerization steps, it is believed to have a function as a compatibilizing agent for them. Therefore, the cross-copolymer obtainable by the process of the present invention, is considered to have excellent mechanical properties, high heat resistance, transparency and processability, as compared with usual olefin/aromatic vinyl compound copolymers.

Further, the present invention provides an economically excellent process for producing a cross-copolymerized olefin/aromatic vinyl compound/diene copolymer and provides a cross-copolymerized olefin/aromatic vinyl compound/diene copolymer thereby obtainable. Such a cross-copolymer is very useful in a wide range of applications.

Process for Producing a Cross-Copolymerized Olefin/Aromatic Vinyl Compound/Diene Copolymer The present invention is a cross-copolymerized olefin/aromatic vinyl compound/diene copolymer (a cross-copolymer) which can be obtained by the following process. Further, the process for producing a cross-copolymer is capable of producing a cross-copolymer which is uniform and which has good processability and excellent transparency and mechanical properties with efficiency and economical feasibility suitable for industrial application.

Namely, the present invention is a process for producing a cross-copolymer, which comprises, as a first polymerization step (a main chain polymerization step), carrying out copolymerization of an aromatic vinyl compound monomer, an olefin monomer and a diene monomer by means of a coordination polymerization catalyst to synthesize an olefin/aromatic vinyl compound/diene copolymer, and then, as a second polymerization step (a crossing step), cross-copolymerizing an olefin/aromatic vinyl compound copolymer using such a copolymer, an olefin, an aromatic vinyl compound monomer and a coordination polymerization catalyst. This process is a process employing at least two polymerization steps comprising the above first polymerization step (the main polymerization step) and the second polymerization step (the crossing step).

It is necessary that the aromatic vinyl compound content of the olefin/aromatic vinyl compound/diene copolymer to be polymerized in the first polymerization step (the main chain polymerization step) and the average aromatic vinyl compound content of an olefin/aromatic vinyl compound copolymer to be polymerized in the second or subsequent polymerization step (which may sometimes be hereinafter referred to as a second polymerization step) (when the polymerization solution obtained in the first polymerization step, is used itself in the second polymerization step, the polymer thereby obtainable contains a small amount of a residual diene copolymerized) are different by at least 5 mol %, preferably at least 10 mol %, most preferably at least 15 mol %. The aromatic vinyl compound content of an olefin/aromatic vinyl compound copolymer to be polymerized in the second or subsequent polymerization step (the crossing step) may be 0% in an extreme case. In such a case, an olefin polymer containing no aromatic vinyl compound will be cross chains.

Further, it is necessary that the aromatic vinyl compound content of the olefin/aromatic vinyl compound/diene copolymer in the first polymerization step and the aromatic vinyl compound content of the finally obtainable cross-copolymerized olefin/aromatic vinyl compound/diene copolymer are different by at least 2 mol %, preferably at least 5 mol %, more preferably at least 10 mol %.

First Polymerization Step (Main Chain Polymerization Step)

The olefin/aromatic vinyl compound/diene copolymer to be used in the present invention, can be obtained by copolymerizing an aromatic vinyl compound monomer, an olefin monomer and a diene monomer in the presence of a single site coordination polymerization catalyst.

The olefin to be used in the present invention may, for example, be ethylene or a $C_{3-20}$ α-olefin, such as propylene, 1-butene, 1-hexene, 4-methyl-1-pentene or 1-octene, or a cyclic olefin such as cyclopentene or norbornene. Preferably, a mixture of ethylene with an α-olefin such as propylene, 1-butene, 1-hexene or 1-octene, an α-olefin such as propylene, or ethylene, is employed. More preferably, ethylene or a mixture of ethylene with an α-olefin, is employed. Particularly preferably, ethylene is employed.

As the aromatic vinyl compound to be used in the present invention, styrene is preferably employed, but it is possible to employ other aromatic vinyl compound, such as p-chlorostyrene, p-tert-butylstyrene, vinyl naphthalene, p-methylstyrene, vinyl naphthalene or vinyl anthracene. Further, a mixture of such compounds may be employed.

Further, as the diene to be used in the present invention, a coordination-polymerizable diene may be employed. Preferably, 1,4-hexadiene, 1,5-hexadiene, ethylidenenorbornene, dicyclopentadiene, norbornadiene, 4-vinyl-1-cyclohexene, 3-vinyl-1-cyclohexene, 2-vinyl-1- cyclohexene, o-divinylbenzene, p-divinylbenzene, m-divinylbenzene, or a mixture of them, may be mentioned. Further, it is possible to employ a diene wherein a plurality of double bonds (vinyl groups) are bonded via a $C_{6-30}$ hydrocarbon group containing a single or plural aromatic vinyl ring structures. Further, dienes disclosed in JP-A-6-136060 and JP-A-11-124420 can also be employed in the present invention. Preferred is a diene wherein one of double bonds (vinyl groups) is used for coordination polymerization so that remaining double bonds in a polymerized state are coordination-polymerizable. More preferably, one of o-, p- and m-divinylbenzenes, or a mixture thereof, is suitably employed. Most preferably, m-divinylbenzene having an isomer purity of at least 80 weight %, preferably at least 90 weight %, is employed.

In the present invention, the amount of the diene to be used in the main chain polymerization step is from 1/50,000 to 1/100, preferably from 1/20,000 to 1/400, of the amount of styrene to be used, in a molar ratio. If the main chain polymerization step is carried out at a diene concentration higher than this, many crosslinking structures of polymer will be formed during the polymerization, whereby gelation or the like will take place, or the processability or physical properties of the cross-copolymer finally obtainable via the crossing step, tend to deteriorate, such being undesirable. Further, if the main chain polymerization step is carried out at a diene concentration higher than this, the residual diene concentration in the polymerization solution tends to be high, and if such a polymer solution is used for the crossing step as it is, many crosslinking structures tend to form, whereby the obtained cross-copolymer tends to be likewise poor in the processability or physical properties.

In order to obtain a cross-copolymer excellent particularly in softness, the olefin/aromatic vinyl compound/diene copolymer polymerized in the first polymerization step (the main chain polymerization step), preferably has a composition wherein the aromatic vinyl compound content is at least about 15 mol % and at most 50 mol %, the diene content is at least 0.001 mol % and less than 0.5 mol %, and the rest is an olefin. Particularly, in order to obtain a cross-copolymer having the characteristics of a soft polyvinyl chloride resin (a feeling such as softness, a tan δ component in the vicinity of room temperature in the viscoelasticity spectrum), the aromatic vinyl compound is particularly preferably styrene, and in such a case, an olefin/aromatic vinyl compound/diene copolymer having a styrene content of from about 20 mol % to 50 mol %, a diene content of from 0.001 mol % to less than 0.5 mol % and the rest being an olefin, is employed.

Further, in order to obtain a cross-copolymer having both softness and cold resistance, the olefin/aromatic vinyl compound/diene copolymer polymerized in the first polymerization step (the main chain polymerization step), preferably has a composition wherein the aromatic vinyl compound content is at least 10 mol % and at most 30 mol %, the diene content is at least 0.001 mol % and less than 0.5 mol %, and the rest is an olefin.

Further, the diene content of the olefin/aromatic vinyl compound/diene copolymer obtained in the first polymerization step (the main chain polymerization step) is at least 0.0001 mol % and at most 3 mol %, preferably at least 0.001 mol % and less than 0.5 mol %, most preferably at least 0.01 mol % and less than 0.3 mol %. If the diene content in the copolymer is higher, the processability of the cross-copolymer finally obtainable via the second polymerization step (the crossing step) tends to be poor, such being undesirable.

The single site coordination polymerization catalyst to be used in the first polymerization step (the main chain polymerization step) may, for example, be a polymerization catalyst comprising a transition metal compound and a cocatalyst i.e. a soluble Zieglar-Natta catalyst or a transition metal compound catalyst activated with methyl aluminoxane or a boron compound (a so-called metallocene catalyst or half metallocene catalyst, a CGCT catalyst, etc.).

Specifically, polymerization catalysts disclosed in the following literatures and patents, can be employed.

For example, metallocene catalysts disclosed in U.S. Pat. No. 5,324,800, JP-A-7-37488, JP-A-6-49132, Polymer Preprints, Japan, 42, 2292 (1993), Macromol. Chem., Rapid Commun., 17, 745 (1996), J-A-9-309925, EP0872492A2 and JP-A-6-184179.

Half metallocene catalysts disclosed in Makromol. Chem. 191, 2387 (1990).

CGCT catalysts disclosed in JP-A-3-163088, JP-A-7-53618 and EP-A-416815.

Soluble Zieglar-Natta catalysts disclosed in JP-A-3-250007 and Stud. Surf. Sci. Catal., 517 (1990).

An olefin/aromatic vinyl compound/diene copolymer having a uniform composition with a diene uniformly contained in the polymer, is suitably employed to obtain a cross-copolymer of the present invention. However, it is difficult to obtain such a copolymer having a uniform composition by a Zieglar-Natta catalyst, and a single site coordination polymerization catalyst is preferably employed. The single site coordination polymerization catalyst is a polymerization catalyst comprising a transition metal compound and a cocatalyst, i.e. a polymerization catalyst comprising a transition metal compound catalyst activated with methyl aluminoxane or a boron compound (a so-called metallocene catalyst or half metallocene catalyst, a CGCT catalyst, etc.).

In the present invention, a single site coordination polymerization catalyst comprising one type of a transition metal compound and a cocatalyst, is preferably employed.

In the present invention, the single site coordination polymerization catalyst to be most preferably employed, is a polymerization catalyst comprising a transition metal compound represented by the following general formula (1) and a cocatalyst.

When a polymerization catalyst comprising a transition metal compound represented by the following general formula (1) and a cocatalyst, is employed, a diene, particularly divinylbenzene, can be copolymerized to a polymer in high efficiency, whereby it is possible to substantially reduce the amount of the diene to be employed in the first polymerization step (the main chain polymerization step) and the amount of an unreacted diene remaining in the polymerization solution.

If the amount of the diene to be employed in the main chain polymerization step is large, i.e. if the concentration is high, crosslinking of the polymer takes place substantially as the diene unit structures serve as crosslinking points during the main chain polymerization, whereby gelation or non-solubilization takes place, and the cross-copolymer or the processability of the cross-copolymer tends to deteriorate. Further, if the non-polymerized diene remains substantially in the polymerization solution obtained in the main chain polymerization step, the crosslinking degree of cross chains will be remarkably high in the subsequent cross polymerization step, whereby the obtained crossed copolymer or the cross-copolymer will be insolubilized or gelled to deteriorate the processability.

Further, when a polymerization catalyst comprising a transition metal compound represented by the following general formula (1) and a cocatalyst, is employed, it is possible to produce an olefin/aromatic vinyl compound/diene copolymer having a uniform composition with a remarkably high activity suitable for industrial application. Further, a copolymer having high transparency can be presented especially with a copolymer having an aromatic vinyl compound content of from 1 mol % to 20 mol %. Further, with a composition having an aromatic vinyl compound content of from 1 mol % to 96 mol %, an olefin/aromatic vinyl compound/diene copolymer excellent in mechanical properties, having an isotactic stereoregularity and a head-to-tail styrene chain structure, can be presented.

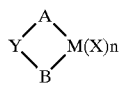

General formula (1)

wherein
- A and B are independently a group selected from an unsubstituted or substituted benzoindenyl group, an unsubstituted or substituted cyclopentadienyl group, an unsubstituted or substituted indenyl group, or an unsubstituted or substituted fluorenyl group;
- Y is a methylene group, a silylene group, an ethylene group, a germilene group or a boron residue, which has bonds to A and B and which further has hydrogen or a group containing a $C_{1-20}$ hydrocarbon (this group may have from 1 to 5 nitrogen, boron, silicon, phosphorus, selenium, oxygen, fluorine, chlorine or sulfur atoms), as a substituent, the substituents may be the same or different from one another, and Y may have a cyclic structure such as a cyclohexylidene group or a cyclopentylidene group;
- each X is independently hydrogen, a halogen, a $C_{1-15}$ alkyl group, a $C_{6-10}$ aryl group, a $C_{8-12}$ alkylaryl group, a silyl group having a $C_{1-4}$ hydrocarbon substituent, a $C_{1-10}$ alkoxy group, or an amide group having hydrogen or a $C_{1-22}$ hydrocarbon substituent, and n is an integer of 0, 1 or 2; and
- M is zirconium, hafnium or titanium.

Particularly preferred is a polymerization catalyst comprising a transition metal compound of the above general formula (1) wherein at least one of A and B is an unsubstituted or substituted benzoindenyl group or an unsubstituted or substituted indenyl group, and a cocatalyst.

The unsubstituted or substituted benzoindenyl group can be represented by the following formulae Ka 3 to Ka 5. In the following chemical formulae, each of R1b to R3b which are independent of one another, is hydrogen, a $C_{1-20}$ hydrocarbon group which may contain from 1 to 3 nitrogen, boron, silicon, phosphorus, selenium, oxygen or sulfur atoms, preferably a $C_{1-20}$ alkyl group, a $C_{6-10}$ aryl group or a $C_{7-20}$ alkylaryl group, or a halogen atom, an $OSiR_3$ group, a $SiR_3$ group, a $NR_2$ group or a $PR_2$ group (each R represents a $C_{1-10}$ hydrocarbon group) Further, adjacent such groups may together form a single or plural 5- to 10-membered aromatic or alicyclic rings.

Further, each of R1a to R3a which are independent of one another, is hydrogen, a $C_{1-20}$ hydrocarbon group which may contain from 1 to 3 nitrogen, boron, silicon, phosphorus, selenium, oxygen or sulfur atoms, preferably a $C_{1-20}$ alkyl group, a $C_{6-10}$ aryl group or a $C_{7-20}$ alkylaryl group, or a halogen atom, an $OSiR_3$ group, a $SiR_3$ group, a $NR_2$ group or a $PR_2$ group (each R represents a $C_{1-10}$ hydrocarbon group), but is preferably hydrogen.

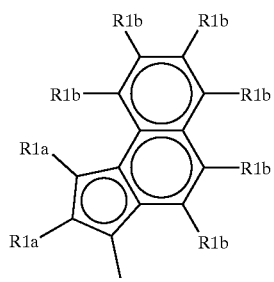

Ka 3

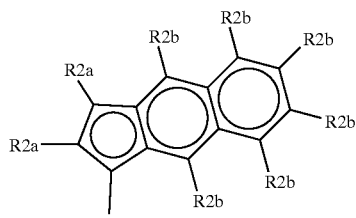

Ka 4

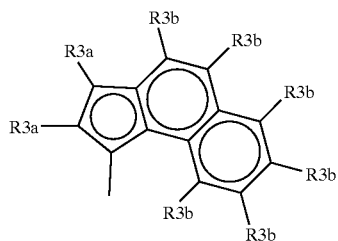

Ka 5

The unsubstituted benzoindenyl group may, for example, be 4,5-benzo-1-indenyl (another name: benzo(e)indenyl), 5,6-benzo-1-indenyl or 6,7-benzo-1-indenyl, and the substituted benzoindenyl group, may, for example, be α-acenaphtho-1-indenyl, 3-cyclopenta[c]phenanthryl, or 1-cyclopenta[1]phenanthryl.

Particularly preferably, the unsubstituted benzoindenyl group is 4,5-benzo-1-indenyl (another name: benzo(e) indenyl), and the substituted benzoindenyl may, for example, be α-acenaphtho-1-indenyl, 3-cyclopenta[c] phenanthryl or 1-cyclopenta[1]phenanthryl.

The unsubstituted or substituted indenyl group, the unsubstituted or substituted fluorenyl group, or the unsubstituted or substituted cyclopentadienyl group may be represented by the formulae Ka 6 to Ka 8.

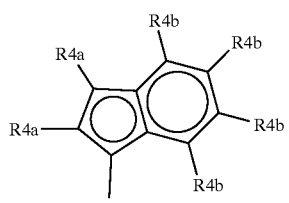

Ka 6

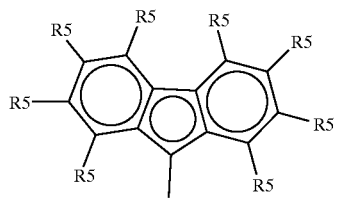

Ka 7

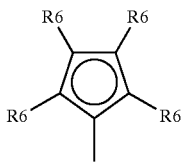

Ka 8

Each of R4b and R6 which are independent of each other is hydrogen, a $C_{1-20}$ hydrocarbon group which may contain from 1 to 3 nitrogen, boron, silicon, phosphorus, selenium, oxygen or sulfur atoms, preferably a $C_{1-20}$ alkyl group, a $C_{6-10}$ aryl group or a $C_{7-20}$ alkylaryl group, or a halogen atom, an $OSiR_3$ group, a $SiR_3$ group, a $NR_2$ group or a $PR_2$ group (each R represents a $C_{1-10}$ hydrocarbon group). Further, adjacent such groups may together form a single or plural 5- to 10-membered (except for 6-membered) aromatic or alicyclic rings. However, preferred is hydrogen.

Each R5 is independently hydrogen, a $C_{1-20}$ hydrocarbon group which may contain from 1 to 3 nitrogen, boron, silicon, phosphorus, selenium, oxygen or sulfur atoms, preferably a $C_{1-20}$ alkyl group, a $C_{6-10}$ aryl group, or a $C_{7-20}$ alkylaryl group, or a halogen atom, an $OSiR_3$ group, a $SiR_3$ group, a $NR_2$ group or a $PR_2$ group (each R represents a $C_{1-10}$ hydrocarbon group). Further, adjacent such groups may together form a single or plural 5- to 10-membered aromatic or alicyclic rings. However, preferred is hydrogen.

Further, R4a is independently hydrogen, a $C_{1-20}$ hydrocarbon group which may contain from 1 to 3 nitrogen, boron, silicon, phosphorus, selenium, oxygen or sulfur atoms, preferably a $C_{1-20}$ alkyl group, a $C_{6-10}$ aryl group or a $C_{7-20}$ alkylaryl group, or a halogen atom, an $OSiR_3$ group, a $SiR_3$ group, a $NR_2$ group or a $PR_2$ group (each R represents a $C_{1-10}$ hydrocarbon group) but is preferably hydrogen.

When both A and B are an unsubstituted or substituted benzoindenyl group, or an unsubstituted or substituted indenyl group, they may be the same or different.

For the production of a copolymer to be used in the present invention, it is particularly preferred that at least one of A and B is an unsubstituted or substituted benzoindenyl group.

Further, it is most preferred that both are an unsubstituted or substituted benzoindenyl group.

In the above general formula (1), Y is a methylene group, a silylene group, an ethylene group, a germilene group or a boron residue, which has bonds to A and B and which further has hydrogen or a group containing a $C_{1-20}$ hydrocarbon (this group may have from 1 to 5 nitrogen, boron, silicon, phosphorus, selenium, oxygen, fluorine, chlorine or sulfur atoms), as a substituent. The substituents may be the same or different from one another. Further, Y may have a cyclic structure such as a cyclohexylidene group or a cyclopentylidene group.

Preferably, Y is a substituted methylene group or a substituted boron group, which has bonds to A and B and which is substituted by hydrogen, a $C_{1-20}$ hydrocarbon group, an amino group or a trimethylsilyl group. More preferably, Y is a substituted methylene group, which has bonds to A and B and which is substituted by hydrogen or a $C_{1-20}$ hydrocarbon group.

The hydrocarbon group may, for example, be an alkyl group, an aryl group, a cycloalkyl group or a cycloaryl group. The substituents may be the same or different from one another.

As preferred examples, Y is, for example, —$CH_2$—, —$CMe_2$—, —$CEt_2$—, —$CPh_2$—, a cyclohexylidene group or a cyclopentylidene group. Here, Me represents a methyl group, Et an ethyl group, and Ph a phenyl group.

Each X is independently hydrogen, a halogen, a $C_{1-15}$ alkyl group, a $C_{6-10}$ aryl group, a $C_{8-10}$ alkylaryl group, a silyl group having a $C_{1-4}$ hydrocarbon substituent, a $C_{1-10}$ alkoxy group, or an amide group or an amino group, which has hydrogen or a $C_{1-22}$ hydrocarbon substituent, and n is an integer of 0, 1 or 2.

The halogen may be chlorine, bromine or fluorine, the alkyl group may, for example, be a methyl group or an ethyl group, the aryl group may, for example, be a phenyl group, the alkylaryl group may, for example, be a benzyl group, the silyl group may, for example, be a trimethylsilyl group, the alkoxy group may, for example, be a methoxy group, an ethoxy group or an isopropoxy group, and the amide group may, for example, be a dialkylamide group such as a dimethylamide group, or an aryl amide group such as N-methyl anilide, N-phenyl anilide or an anilide group. Further, as X, the groups disclosed in U.S. Pat. No. 5,859,276 and U.S. Pat. No. 5,892,075 may be employed.

M is zirconium, hafnium or titanium, particularly preferably zirconium.

As examples of such a transition metal compound, the transition metal compounds disclosed in EP-0872492A2, JP-A-11-130808, JP-A-9-309925, WO00/20426, EP-0985689A2 and JP-A-6-184179, may be mentioned.

Particularly preferred are transition metal compounds having a substituted methylene-bridged structure, as specifically disclosed in EP-0872492A2, JP-A-11-130808 and JP-A-9-309925.

As the cocatalyst to be used in the process of the present invention, a known cocatalyst used in combination with a conventional transition metal compound, or an alkyl aluminum compound may be used. As such a cocatalyst, methyl aluminoxane (or may be referred to as methyl alumoxane or MAO) or a boron compound is suitably employed. As examples of the cocatalyst (methyl aluminoxane or a boron compound) or the alkyl aluminum compound to be used, the cocatalysts (methyl aluminoxane or boron compounds) or the alkyl aluminum compounds disclosed in EP-0872492A2, JP-A-11-130808, JP-A-9-309925, WO00/20426, EP-0985689A2 or JP-A-6-184179, may be mentioned.

Further, the cocatalyst to be used at that time, is preferably an aluminoxane (or may be referred to as an alumoxane) represented by the following general formula (2) or (3).

General Formula (2)

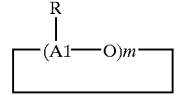

wherein R is a $C_{1-5}$ alkyl group, a $C_{6-10}$ aryl group or hydrogen, and m is an integer of from 2 to 100. The plurality of R may be the same or different from one another.

General Formula (3)

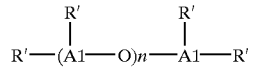

wherein R' is a $C_{1-5}$ alkyl group, a $C_{6-10}$ aryl group or hydrogen, and n is an integer of from 2 to 100. The plurality of R' may be the same or different from one another.

At the time of producing an olefin/aromatic vinyl compound/diene copolymer to be used in the present invention, the above described various monomers, the transition metal compound (the metal complex) and the cocatalyst are brought in contact with one another. With respect to the order of contact and the contacting method, optional known methods may be employed.

The above copolymerization or polymerization method may, for example, be a method of polymerizing in a liquid monomer without using a solvent, or a method of employing a single solvent or a mixed solvent selected from a saturated aliphatic or aromatic hydrocarbon or a halogenated hydrocarbon, such as pentane, hexane, heptane, cyclohexane, benzene, toluene, ethylbenzene, xylene, chloro-substituted benzene, chloro-substituted toluene, methylene chloride or chloroform. Preferably, a mixed alkane type solvent, cyclohexane, toluene or ethylbenzene is employed. The polymerization mode may be solution polymerization or slurry polymerization. Further, as the case requires, a known method such as batch polymerization, continuous polymerization, preliminary polymerization or multi step polymerization, may be employed.

Linear or loop, single or connected plural pipe polymerizers may also be employed. In such a case, the pipe polymerizers may have various known mixers such as dynamic or static mixers or static mixers equipped with a cooling means, or various known coolers such as coolers equipped with cooling slender pipes. Further, they may have a batch type preliminary polymerizer. Further, a method such as gas phase polymerization may be employed.

The temperature for polymerization is suitably from −78° C. to 200° C. A polymerization temperature lower than −78° C., is industrially disadvantageous, and if it exceeds 200° C., decomposition of the transition metal compound tends to take place, such being undesirable. Industrially more preferably, it is from 0° C. to 160° C., particularly preferably from 30° C. to 160° C.

The pressure during the polymerization is usually from 0.1 atm to 1000 atm, preferably from 1 to 100 atm, particularly industrially preferably from 1 to 30 atm.

When alumoxane (or aluminoxane) is used as a cocatalyst, it is used in a ratio to the metal of the transition metal compound of from 0.1 to 100,000, preferably from 10 to 10,000, by a ratio of aluminum atom/metal atom of the transition metal compound. If the ratio is smaller than 0.1, the transition metal compound cannot effectively be activated, and if it exceeds 100,000, such being economically disadvantageous.

When a boron compound is used as a cocatalyst, it is used in a ratio of from 0.01 to 100, preferably from 0.1 to 10, particularly preferably 1, by a ratio of boron atom/metal atom of the transition metal compound.

If the ratio is smaller than 0.01, the transition metal compound cannot effectively be activated, and if it exceeds 100, such being economically disadvantageous.

The transition metal compound and the cocatalyst may be mixed and prepared outside the polymerization tank, or may be mixed in the tank at the time of polymerization.

In the first polymerization step of the present invention, the olefin partial pressure may be continuously or stepwisely changed within a range of more than 50% and less than 150%, relative to the olefin partial pressure at the initiation of the polymerization. The olefin partial pressure in the first polymerization step is preferably maintained to be constant during the polymerization.

Further, in the first polymerization step of the present invention, the concentration of the aromatic vinyl compound in the polymerization solution can be continuously or stepwisely changed within a range of more than 30% and less than 200%, relative to the concentration at the initiation of the polymerization. Furthers it is preferred to set the conversion of the aromatic vinyl compound monomer at a level of less than 70% (to set the aromatic vinyl compound concentration higher by more than 30% as compared with the initiation of the polymerization) without carrying out divided addition of the aromatic vinyl compound monomer.

Olefin/Aromatic Vinyl Compound/Diene Copolymer to be Used in the Present Invention The olefin/aromatic vinyl compound/diene copolymer to be used in the present invention can be synthesized from the respective monomers of an aromatic vinyl compound, an olefin and a diene by means of a single site coordination polymerization catalyst in the above-described first polymerization step.

As the olefin/aromatic vinyl compound/diene copolymer obtained in the first polymerization step (the main chain polymerization step) of the present invention, preferred is an ethylene/styrene/diene copolymer, an ethylene/styrene/α-olefin/diene copolymer or an ethylene/styrene/cyclic olefin/diene copolymer, and particularly preferably, an ethylene/styrene/diene copolymer, may be employed.

Further, the olefin/aromatic vinyl compound/diene copolymer obtained in the first polymerization step (the main chain polymerization step) of the present invention may have a cross structure or a crosslinked structure with the contained diene monomer units, but it is necessary that the gel content is less than 10 weight %, preferably less than 0.1 weight %, of the entirety.

Now, a typical suitable ethylene/styrene/diene copolymer to be used in the present invention, will be described.

The ethylene/styrene/diene copolymer obtained by the first polymerization step (the main chain polymerization step) preferably has a chain structure of head-to-tail styrene units attributable to peaks observed at from 40 to 45 ppm by the 13C-NMR measurement based on TMS. Further, it is preferred to have a chain structure of styrene units attributable to peaks observed at 42.3 to 43.1 ppm, 43.7 to 44.5 ppm, 40.4 to 41.0 ppm and 43.0 to 43.6 ppm.

Further, the copolymer to be suitably used in the present invention, is an ethylene/styrene/diene copolymer obtainable by means of a metallocene catalyst capable of producing an isotactic polystyrene by homopolymerization of styrene, and an ethylene/styrene/diene copolymer obtainable by means of a metallocene catalyst capable of producing polyethylene by homopolymerization of ethylene.

Therefore, the obtained ethylene/styrene/diene copolymer may have ethylene chain structures, head-to-tail styrene chain structures and structures having ethylene units and styrene units bonded, in its main chain.

On the other hand, with conventional so-called pseudo-random copolymers, no styrene head-to-tail chain structure is observed even when the styrene content is in the vicinity of the maximum of 50 mol %. Further, even if homopolymerization of styrene is attempted by means of a catalyst for the preparation of a pseudo-random copolymer, no polymer can be obtained. Depending upon the polymerization conditions, etc., a very small amount of atactic styrene homopolymer may sometimes be obtainable, but this should be understood to have been formed by cation polymerization or radical polymerization due to methylalumoxane which is coexists or due to an alkylaluminum included therein.

The ethylene/styrene/diene copolymer obtainable in the first polymerization step (the main chain polymerization step) to be preferably employed in the present invention, is a copolymer wherein the stereoregularity of phenyl groups in the alternating structure of styrene and ethylene represented by the following general formula (4) contained in its structure, is such that the isotactic diad index (or the meso diad index) m is larger than 0.5, preferably larger than 0.75, particularly preferably larger than 0.95.

The isotactic diad index m of the alternating copolymer structure of ethylene and styrene, can be obtained by the following formula (ii) from an area Ar of the peak attributable to the r structure of the methylene carbon peak and an area Am of the peak attributable to the m structure appearing in the vicinity of 25 ppm:

$$m=Am/(Ar+Am) \quad \text{Formula (ii)}$$

The positions of the peaks may sometimes shift more or less depending upon the measuring conditions or the solvent. For example, when chloroform-d is used as a solvent, and TMS is used as standard, the peak attributable to the r structure appears in the vicinity of from 25.4 to 25.5 ppm, and the peak attributable to the m structure appears in the vicinity of from 25.2 to 25.3 ppm.

Further, when tetrachloroethane-d2 is used as a solvent, and the center peak at 73.89 ppm of the triplet of tetrachloroethane-d2 is used as standard, the peak attributable to the r structure appears in the vicinity of from 25.3 to 25.4 ppm, and the peak attributable to the m structure appears in the vicinity of from 25.1 to 25.2 ppm.

Here, the m structure represents a meso diad structure, and the r structure represents a racemic diad structure.

The ethylene/styrene/diene copolymer to be obtained in the first polymerization step (the main chain polymerization step) is preferably a copolymer wherein the alternating structure index λ (represented by the following formula (i)) indicating the proportion of the alternating structure of styrene and ethylene represented by the general formula (4) contained in the copolymer structure, is smaller than 70 and larger than 0.01, preferably smaller than 30 and larger than 0.1.

$$\lambda=A3/A2\times100 \quad \text{Formula (i)}$$

wherein A3 is the sum of areas of three peaks a, b and c attributable to an ethylene/styrene alternating structure represented by the following general formula (4'), obtained by the 13C-NMR measurement, and A2 is the sum of areas of peaks attributable to the main chain methylene and methine carbon, as observed within a range of from 0 to 50 ppm by 13C-NMR using TMS as standard.

$$\mathrm{-\!\!-\!\!-(CH\!\!-\!\!-\!\!-CH_2\!\!-\!\!-CH_2\!\!-\!\!-CH_2)x\!\!-\!\!-\!\!-} \atop {|\atop Ph}} \quad \text{General Formula (4)}$$

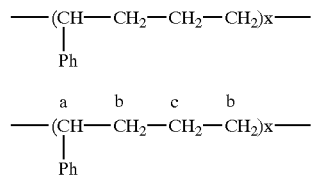

General Formula (4')

(wherein Ph represents a phenyl group, and x represents the number of repeating units and is an integer of at least 2.)

For an ethylene/styrene/diene copolymer having a diene content of at most 3 mol %, preferably less than 1 mol %, it is effective to have head-to-tail styrene chains and/or to have isotactic stereoregularity in the ethylene/styrene alternating structure, and/or to have an alternating structure index λ of smaller than 70, so that it will be an elastomer copolymer having a high transparency and high mechanical strength such as breaking strength. A copolymer having such characteristics can be suitably employed in the present invention.

Especially, a copolymer having a high level of isotactic stereoregularity in the ethylene/styrene alternating structure and an alternating structure index λ of smaller than 70, is preferred as the copolymer of the present invention. Further, a copolymer having a head-to-tail styrene chain, an isotactic stereoregularity in the ethylene/styrene alternating structure, and an alternating structure index λ of smaller than 70, is particularly preferred as the copolymer of the present invention.

Namely, a preferred ethylene/styrene/diene copolymer of the present invention has a characteristic such that it has an alternating structure of ethylene and styrene having high stereoregularity and at the same time has various structures such as ethylene chains having various lengths, inversion bonds of styrene and styrene chains having various lengths simultaneously. Further, the ethylene/styrene/diene copolymer of the present invention has a characteristic such that the proportion of the alternating structure can be variously changeable by the content of styrene in the copolymer, the polymerization catalyst or the polymerization conditions employed, within such a range that the value λ obtained by the above formula is more than 0.01 and less than 70.

It is important that the alternating index λ is lower than 70 in order to present significant mechanical strength, solvent resistance, toughness and transparency despite a crystallizable polymer, or in order to be a partially crystallizable polymer, or in order to be a non-crystallizable polymer.

The above-described olefin/aromatic vinyl compound/diene copolymer to be preferably employed in the present invention, particularly an ethylene/styrene/divinylbenzene copolymer, can be obtained by means of a polymerization catalyst comprising a transition metal compound represented by the above general formula (1) and a cocatalyst.

In the foregoing, as a typical preferred example of the olefin/aromatic vinyl compound/diene copolymer to be used in the present invention, an ethylene/styrene/diene copolymer has been described, but the olefin/aromatic vinyl compound/diene copolymer to be used in the present invention is not, of course, limited to this.

The weight average molecular weight of the olefin/aromatic vinyl compound/diene copolymer to be used in the present invention is at least 10,000, preferably at least 30,000, particularly preferably at least 60,000, and at most 1,000,000 preferably at most 500,000. The molecular weight distribution (Mw/Mn) is not particularly limited, but is usually at most 6, preferably at most 4, most preferably at most 3.

Here, the weight average molecular weight is a molecular weight calculated as polystyrene obtained by using standard polystyrene by GPC. The same will apply to the following description.

The weight average molecular weight of the olefin/aromatic vinyl compound/diene copolymer to be used in the present invention can be adjusted as the case requires, within the above range, by a known method employing a chain transfer agent such as hydrogen or by changing the polymerization temperature.

The olefin/aromatic vinyl compound/diene copolymer obtainable in the first polymerization step (the main chain polymerizations step) of the present invention may have a partially crossing structure or branched structure via diene units contained.

Further, another embodiment of the present invention is an olefin/aromatic vinyl compound/divinylbenzene copolymer having an aromatic vinyl compound content of from 0 mol % to 96 mol %, preferably from 0.03 mol % to 96 mol %, a diene content of from 0.0001 mol % to 3 mol %, the rest being an olefin, obtained by copolymerizing m-divinylbenzene having an isomer purity of at least 80 weight %, preferably at least 90 weight %, an olefin and an aromatic vinyl compound. Such an olefin/aromatic vinyl compound/divinylbenzene copolymer can be obtained by the process disclosed in the present invention, and it is useful preferably for the production of the cross-copolymerized olefin/aromatic vinyl compound/diene copolymer of the present invention. Further, it may be used for other applications, such as for the production of a cross-linked polymer, by e.g. a radical method or electron ray cross linking, or as a resin additive or a modifying material.

B) Second Polymerization Step (Crossing Step)

As the second polymerization step of the present invention, coordination polymerization employing the above-mentioned single site coordination polymerization catalyst, is employed. Preferably, a single site coordination polymerization catalyst comprising a transition metal compound represented by the same general formula (1) as in the first polymerization step and a cocatalyst, is employed. This single site coordination polymerization catalyst comprising a transition metal compound represented by the general formula (1) and a cocatalyst, is capable of copolymerizing residual coordination polymerizable double bonds of diene units, particularly divinylbenzene, copolymerized to the polymer main chain, at high efficiency, and it is preferred in the present invention. In the second polymerization step of the present invention, it is most preferred to employ the same single site coordination polymerization catalyst as used in the first polymerization step (the same transition metal compound, and the same cocatalyst). The copolymer obtainable in the second polymerization step of the present invention preferably has the same structure as the copolymer in the above-mentioned first polymerization step.

In the second polymerization step of the present invention, the same method as the polymerization method employed in the above-mentioned first polymerization step, is employed. In this case, the respective monomers employed in the above-mentioned first polymerization step, the olefin, the aromatic vinyl compound, and, if necessary, the diene remaining in the polymerization solution, may be employed.

The second polymerization of the present invention is preferably carried out following the first polymerization step by using the polymerization solution obtained in the above first polymerization step. However, the second polymerization step may be carried out in the presence of a single site coordination polymerization catalyst by recovering the copolymer obtained in the above first polymerization step from the polymerization solution, dissolving it in a new solvent and adding monomers to be employed.

The aromatic vinyl compound content is required to be different by at least 5 mol %, preferably 10 mol %, most preferably at least 15 mol %, as between the olefin/aromatic vinyl compound/diene copolymer to be polymerized in the first polymerization step (the main chain polymerization step) of the present invention and the olefin/aromatic vinyl compound copolymer or the olefin/aromatic vinyl compound/diene copolymer to be polymerized in the second or subsequent polymerization step (the crossing step) (when the polymerization solution obtained in the first polymerization step is used as it is, in the second or subsequent polymerization step, the resulting polymer will have a small amount of a residual diene copolymerized). In an extreme case, the aromatic vinyl compound content in the olefin/aromatic vinyl compound copolymer to be polymerized in the second or subsequent polymerization step (the crossing step) may be 0 mol %. In this case, it is preferred to carry out the second polymerization step by recovering the copolymer from the polymerization solution obtained in the first polymerization step and dissolving it in a new solvent, and adding a catalyst, a cocatalyst and an olefin.

Further, the aromatic vinyl compound content in the olefin/aromatic vinyl compound/diene copolymer obtainable in the first polymerization step and the aromatic vinyl compound content in the finally obtainable cross-copolymerized olefin/aromatic vinyl compound/diene copolymer, are required to be different by at least 2 mol %, preferably at least 5 mol %, more preferably at least 10 mol %.

The polymer obtainable in the second polymerization step (the cross chain polymerization step) of the present invention may have a partially crossing structure or a branched structure via diene units contained.

In a case where the polymerization solution obtained in the first polymerization step is employed in the second polymerization step, an unreacted diene remaining in the polymerization solution will be copolymerized in the second polymerization step, and the diene content is usually within a range of from 0.0001 mol % to 3 mol %, preferably from 0.001 mol % to less than 0.5 mol %, in the olefin/aromatic vinyl compound copolymer (inclusive of cross chains) to be obtained in the second polymerization step. If the diene content is higher than this range, the finally obtainable cross copolymer tends to be insolubilized or gelled to deteriorate the processability, such being undesirable.

A specific process for producing the cross-copolymer of the present invention, which satisfies the foregoing, will be described below.

Namely, it is a process for producing a cross-copolymerized olefin/aromatic vinyl compound/diene copolymer, employing a polymerization method of at least two steps comprising as the first polymerization step (the main chain polymerization step) carrying out copolymerization of an aromatic vinyl compound monomer, an olefin monomer and a diene monomer by means of a coordination polymerization catalysts to synthesize an olefin/aromatic vinyl compound/diene copolymer, and then as the second polymerization step (the crossing step) under polymerization conditions different therefrom, carrying out polymerization by means of a coordination polymerization catalyst in the co-existence of this olefin/aromatic vinyl compound/diene copolymer and at least an olefin and an aromatic vinyl compound monomer. Further, preferred is a process satisfying at least one of the following conditions.

1) The olefin partial pressure of the polymerization system in the second or subsequent polymerization step is at least 150% or at most 50%, relative to the olefin partial pressure at the initiation of the first polymerization step. However, industrially, the olefin partial pressure in the second or subsequent polymerization step is at most 1000 atm, preferably at most 100 atm.

On the other hand, in the present invention, the olefin partial pressure in the first polymerization step is adjusted within a range of higher than 50% and lower than 150% of the olefin pressure at the initiation of the polymerization, but the olefin partial pressure is more preferably constant.

2) The concentration of the aromatic vinyl compound in the polymerization solution at the initiation of the second or subsequent polymerization step is at most 30% or at least 200%, relative to the concentration of the aromatic vinyl compound at the initiation of the first polymerization step.

However, the concentration of the aromatic vinyl compound in the first step in the present invention, is maintained within a range higher than 30% of the concentration at the initiation of the polymerization.

3) In the first polymerization step and the second or subsequent polymerization step, different single site coordination polymerization catalysts are employed.

4) In the first polymerization step and the second or subsequent polymerization step, the type of the olefin to be used for polymerization is different.

The first polymerization step and the second polymerization step are distinguished at such a time point that an operation for such change of conditions has been initiated, or at such a time point that such change of conditions has been satisfied.

The change to satisfy the above conditions is preferably carried out and completed as quickly as possible, preferably within 50%, more preferably within 30%, most preferably within 10% of the polymerization time in the second polymerization step.

The polymerization temperatures in the first polymerization step and the second polymerization step are preferably the same. If they are different, the temperature difference is suitably within about 100° C.

As a method for changing the compositional ratio of monomers in the polymerization solution, a method is available wherein the olefin partial pressure of the polymerization system in the second or subsequent polymerization step is changed at least 150%, preferably 200%, most preferably at least 300%, relative to the first polymerization step. For example, in a case where ethylene is employed as the olefin, when the first polymerization step is carried out under an ethylene pressure of 0.2 MPa, the second polymerization step is carried out under a pressure of at least 0.3 MPa, preferably at least 0.4 MPa, most preferably at least 0.6 MPa.

Further, the olefin partial pressure of the polymerization system in the second or subsequent polymerization step may be changed to at most 50%, preferably at most 20%, relative to the first polymerization step. For example, when the first polymerization step is carried out under an ethylene pressure of 1.0 MPa, the second polymerization step is carried out under a pressure of at most 0.5 MPa, preferably at most 0.2 MPa.

The olefin pressure in the second polymerization step may be constant or changed stepwisely or continuously during the polymerization so long as it satisfies the above conditions.

Further, as a method for changing the compositional ratio of monomers in the polymerization solution, a method may be employed wherein the concentration of the aromatic vinyl compound in the polymerization solution at the initiation of the polymerization in the second or subsequent polymerization step, is changed to at most 30%, preferably at most 20%, or at least 200%, preferably at least 500%, relative to the first polymerization step. For example, in a case where styrene is employed as the aromatic vinyl compound, when the first polymerization step is initiated at a styrene concentration in the polymerization solution of 1 mol %/l the second polymerization step is carried out at a concentration of at most 0.5 mol/l, preferably at most 0.2 mol/l, or at least 2 mol/l, preferably at least 5 mol/l. Further, changes of the above olefin partial pressure and the concentration of the aromatic vinyl compound may be applied in combination.

When the second polymerization step is carried out in the presence of a single site coordination polymerization catalyst by recovering the copolymer obtained in the first polymerization step from the polymerization solution and dissolving it in a new solvent, and adding an olefin and an aromatic vinyl compound monomer, it is possible to employ a single site polymerization catalyst which is different from the first polymerization step.

By changing the type of the olefin to be used for the polymerization in the first polymerization step and the second or subsequent polymerization step, the content of the aromatic vinyl compound in the copolymer polymerized in the first polymerization step, and the second polymerization step or the content of the aromatic vinyl compound in the cross-copolymer finally obtainable, can be changed as described above.

In a case where the second polymerization step is carried out continuously after the first polymerization step employing the polymerization solution obtained in the above first polymerization step, and the monomers remaining in the polymerization solution of the first polymerization step are used for the second polymerization step without addition of a new aromatic vinyl compound monomer, the conversion of the aromatic vinyl compound monomer species throughout the entire polymerization steps is preferably at least 50 weight %, particularly preferably at least 60 weight %. As the conversion of the aromatic vinyl compound monomer becomes higher, the probability that the polymerizable double bonds of diene units in the main chain of the copolymer are cross-copolymerized, will increase For the production of the cross-copolymer of the present invention, it is preferred to employ a process which satisfies 1) and 2) among the above conditions.

Namely, in the second polymerization step, it is preferred to employ the same single site coordination polymerization catalyst (the same transition metal compound, and the same cocatalyst) as in the first polymerization step.

Further, it is preferred that in the first polymerization step and the second or subsequent polymerization step, the type of the olefin to be used for polymerization is the same.

Further, for the production of the cross-copolymer of the present invention, it is most preferred to employ a process which satisfies 1) among the above conditions.

For the production of the cross-copolymer of the present invention, most preferably, a method is employed wherein the olefin partial pressure of the polymerization system in the second or subsequent polymerization step is changed at least 300%, relative to the first polymerization step.

Further, in a case where the olefin partial pressure in the second polymerization step is not constant, i.e. in a case where it varies within the above range, most preferably, a method is employed wherein the olefin partial pressure in the second or subsequent polymerization step is changed at least 300%, relative to the olefin partial pressure at the initiation of the first polymerization step.

The proportion of the copolymer obtained in the first polymerization step is required to be at least 10 weight %, preferably at least 30 weight % of the cross-copolymer finally obtainable. Further, the amount of the polymer (inclusive of the weight of cross chains) obtainable in the second polymerization step is required to be at least 10 weight %, preferably at least 30 weight % of the cross-copolymer finally obtainable. If the proportion of the copolymer obtained in the first polymerization step or in the second polymerization step is less than 10 weight % of the finally obtainable cross-copolymer, the characteristics of the copolymer of the small amount component can not adequately be obtained.

The first polymerization step and the second polymerization step may be carried out in separate reactors. These steps may be carried out by means of a single reactor. In such a case, these steps are distinguished at such a time point that the operation for the change of the conditions as described in the above 1) to 4) has been initiated, or at such a time point that the change of such conditions has been satisfied.

The cross-copolymer of the present invention may be produced in a single reactor by carrying out copolymerization of an olefin, an aromatic vinyl compound and a diene by means of a coordination polymerization catalyst while changing the olefin or aromatic vinyl compound concentration continuously. It will suffice that at least one of the condition changes of the above 1) to 4) is satisfied substantially at the initiation and completion of the polymerization.

Further, the cross-copolymer of the present invention is a cross-copolymer excellent in the mold processability, characterized in that MFR (melt flow rate) as measured under a load of 5 kg at 230° C. is at least 1.0 g/10 min and at most 50 g/10 min. A process for producing such a cross-copolymer of the present invention is not particularly limited, but a process which satisfies at least one of the following production conditions, is preferred.

a) In the first and/or second polymerization step, the polymerization temperature is substantially always at least 80° C., preferably at least 85° C. and at most 160° C.

b) The aromatic vinyl compound content of the polymer obtained in the first polymerization step, is at least 30 mol %, and its weight average molecular weight is at most 250,000.

c) The diene to be employed, is m-divinylbenzene having an isomer purity of at least 80 weight %, preferably at least 90 weight %.

The cross-copolymer of the present invention can be produced by a process comprising the above-mentioned first polymerization step (the main chain polymerization step) and the second polymerization step (the crossing step). For this process, a conventional optional method may be employed. For example, a method may be employed wherein the first polymerization step is carried out by completely mixed type batch polymerization or continuous polymerization, and the second polymerization step is carried out also by similar batch polymerization or continuous polymerization, or a method may be employed wherein the first polymerization step is carried out by completely mixed type batch polymerization or continuous polymerization, and the second polymerization step is carried out by plug flow polymerization. Here, completely mixed type polymerization is a conventional method wherein, for example, a tank-form, a tower-form or loop-form reactor is employed, and it is a polymerization method wherein in the reactor, the polymerization solution is stirred and mixed relatively well to have a substantially uniform composition. Further, plug flow polymerization is a polymerization method wherein in the reactor, mass transfer is restricted, and the polymerization solution has a continuous or non-continuous compositional distribution from the inlet towards the outlet of the reactor. In the second polymerization step of the present invention, a polymerization means of a loop type or a plug flow type having a pipe-form equipped with various cooling and mixing means, is preferred with a view to carrying out heat removal efficiently, since the viscosity of the polymerization solution increases.

Now, the physical properties of a cross-polymerized ethylene/styrene/divinylbenzene copolymer as a typical example of the cross-copolymerized olefin/aromatic vinyl compound/diene copolymer of the present invention, and the applications thereof will be described.

The cross-copolymer of the present invention is characterized in that the compositions (the styrene contents) of the main chain and the cross chain are substantially different. Either the main chain or the cross chain may have a composition having a low styrene content (i.e. a crystal structure derived from ethylene chains). Further, the cross-copolymer of the present invention may contain ethylene/styrene copolymers (which may contain a small amount of divinylbenzene) having different styrene contents corresponding respectively to the styrene contents of the main chain and the cross chain in an optional ratio. However, since the cross copolymer functions as a compatibilizing agent for them, it can have various characteristics and high transparency at the same time.

The cross-copolymer of the present invention has good heat resistance, since it has a crystal structure derived from ethylene chains. Further, it can also have characteristics such as high mechanical properties (breaking strength, tensile modulus) and a low glass transition temperature or a low brittle temperature (at most −50° C.) which an ethylene/styrene copolymer having a low styrene content has. Further, either the main chain or the cross chain can have a composition having a relatively high styrene content, whereby the product can have the characteristics of an ethylene/styrene copolymer having a relatively high styrene content, as described below. Namely, it can have a relatively low tensile modulus, surface hardness, flexibility, a tan δ component in the vicinity of room temperature in the viscoelasticity spectrum (0.05 to 0.80 at 0° C. or 25° C.), an antiscratching property, a feeling like polyvinyl chloride, a painting property and printability.

Further, with the cross-copolymer of the present invention, the hardness can optionally be changed within the scope of a soft resin from a relatively hard resin (a shore A hardness of at least 88) to a soft resin (a shore A hardness of at most 87 and at least about 60) by changing the weight ratio of the main chain copolymer (the copolymer component obtained in the first polymerization step) and the cross chain copolymer (the copolymer component obtained in the second polymerization step). Particularly, in order to make the shore A hardness of the cross-copolymer of the present invention to be at most 87, it is preferred that either copolymer obtained in the first polymerization step or the second polymerization step is substantially non-crystalline, and this substantially non-crystalline copolymer occupies at least 60 weight % in the finally obtainable cross-copolymer. Further, it is particularly preferred that the copolymer obtained in the first polymerization step is substantially non-crystalline, and this substantially non-crystalline copolymer occupies at least 60 weight % of the finally obtainable cross copolymer. Here, substantially non-crystalline means that the melting point of the crystal peak observed by DSC is at most 70° C., more preferably, its heat of fusion is at most 15 J/g, or the crystallinity (crystallization ratio) calculated by an X-ray diffraction method is at most 10%. Further, for the shore A hardness of the cross-copolymer of the present invention to be at most 87 at room temperature, it is important that the glass transition point of the copolymer obtained in the first polymerization step is at most 5° C., preferably at most 0° C.

The cross-copolymerized ethylene/styrene/diene copolymer of the present invention may be used alone and can suitably be employed as a substitute for a known transparent soft resin such as soft polyvinyl chloride.

To the cross-copolymer of the present invention, a stabilizer, an aging-preventing agent, a light resistance-improving agent, an ultraviolet absorber, a plasticizer, a softening agent, a lubricant, a processing adjuvant, a colorant, an antistatic agent, an anti-fogging agent, a blocking-preventing agent, a crystal nucleating agent, etc. which are commonly used for resins, may be incorporated. These additives may be used alone or in combination of a plurality of them.

By virtue of the excellent characteristics, the cross-copolymer of the present invention is used alone or as a composition containing it as the main component and can be suitably used for a stretch film, a shrink film, a packaging material, a sheet, a tube or a hose as a substitute for a known transparent soft resin such as soft polyvinyl chloride.

Application to Films

In a case where the cross-copolymer of the present invention is used as a film or a stretch packaging film, the thickness is not particularly limited, but it is usually from 3 µm to 1 mm, preferably from 10 µm to 0.5 mm. To use it as a stretch packaging film for foods, the thickness is preferably from 5 to 100 µm, more preferably from 10 to 50 µm.

For the production of a transparent film or a stretch packaging film made of the cross-copolymer of the present invention, a common extrusion film-forming method such as an inflation system or a T-die system, may be employed. For the purpose of improving the physical properties, the film or the stretch packaging film of the present invention may be laminated with other suitable film, for example, a film of e.g. isotactic or syndiotactic polypropylene, high density polyethylene, low density polyethylene (LDPE or LLDPE), polystyrene, polyethylene terephthalate or an ethylene/vinyl acetate copolymer (EVA).

Further, the film or the stretch packaging film of the present invention may have self-tackiness or an adhesive property by suitably selecting the composition of the main chain or the cross chain. However, if a stronger self-tackiness is required, it may be laminated with other film having self-tackiness to obtain a multi-layered film.

Further, when a stretch packaging film having a non-tacky surface and a tacky surface on the front and rear sides, is desired, the non-tacky surface may be made of an ethylene/styrene copolymer having a higher ethylene content or a linear low density polyethylene having a density of at least 0.916 g/cm$^3$ in a thickness of from 5 to 30% of the total thickness, the interlayer may be made of the ethylene/styrene copolymer to be used in the present invention, and the tacky layer may be made of one having from 2 to 10 weight % of liquid polyisobutylene, liquid polybutadiene or the like incorporated to the ethylene/styrene copolymer to be used in the present invention, one having from 2 to 10 weight % of liquid polyisobutylene, liquid polybutadiene or the like incorporated to a linear low density polyethylene having a density of at least 0.916 g/cm$^3$, or an ethylene/vinyl acetate copolymer, in a thickness of from 5 to 30% of the total thickness, to obtain a multilayer film. Otherwise, it is also possible to incorporate a suitable tackifier in a suitable amount.

Specific applications of the film of the present invention are not particularly limited, but it is useful as a general packaging material or a container and can be used for e.g. a packaging film, a bag or a pouch. Especially, it can suitably be used as a stretch packaging film or a pallet stretching film for food packaging.

To the molded product, particularly the film or the stretch packaging film, of the present invention, surface treatment with e.g. corona, ozone or plasma, coating with an anti-fogging agent, coating with a lubricant or printing, may be applied, as the case requires.

Among molded products of the present invention, the film or the stretch packaging film may be prepared as a mono-axially or biaxially stretched film, as the case requires.

The film or the stretch packaging film of the present invention may be bonded to the film itself or to a material such as other thermoplastic resin by fusion by means of e.g. heat, supersonic waves, microwave or by bonding by means of e.g. a solvent.

Further, when used as a stretch packaging film for foods, it can be suitably packaged by an automatic packaging machine or a manual packaging machine.

Further, when the film of the present invention has a thickness of, for example, at least 100 µm, a packaging tray for foods, electrical products, etc., can be molded by a technique such has heat molding, vacuum molding, compression molding or air-pressure forming.

Further, the cross-copolymer of the present invention basically does not contain an elutable plasticizer or halogen and thus has a basic characteristic that its environmental compatibility or safety is high.

The cross-copolymer of the present invention may be used as a composition with other polymers.

Known polymers or additives for the conventional compositions with an ethylene/styrene copolymer, can also be employed for a composition with the cross-copolymer of the present invention. The following may be mentioned as such polymers and additives. The following polymers may be added within a range of from 1 to 99 parts by weight, preferably from 30 to 95 parts by weight, based on the composition employing the cross-copolymer of the present invention. Further, the cross-copolymer of the present invention can be used also as a compatibilizing agent for "an aromatic vinyl compound type polymer" and "an olefin type polymer". With the cross-copolymer of the present invention, the olefin/aromatic vinyl compound content ratio in the main chain and the cross chain can substantially be changed, whereby it is possible to increase the compatibility with the respective polymers, and it is suitably employed as a compatibilizing agent for that purpose. In this case, the cross-copolymer of the present invention can be used within a range of from 1 to 50 parts by weight, preferably from 1 to 20 parts by weight, based on the composition. Further, in the case of "a filler" or "a plasticizer", it can be used within a range of from 1 to 80 parts by weight, preferably from 5 to 50 parts by weight, based on the composition.

Aromatic Vinyl Compound Type Polymer

A homopolymer of an aromatic vinyl compound, and a copolymer of an aromatic vinyl compound with at least one monomer component copolymerizable therewith, wherein the aromatic vinyl compound content is at least 10 weight %, preferably at least 30 weight %. The aromatic vinyl compound monomer to be used for the aromatic vinyl compound type polymer includes styrene and various substituted styrenes such as p-methylstyrene, m-methylstyrene, methylstyrene, o-t-butylstyrene, m-t-butylstyrene, p-t-butylstyrene and α-methylstyrene, and further, a compound having a plurality of vinyl groups in one molecule, such as divinylbenzene, may also be mentioned. Further, a copolymer of a plurality of such aromatic vinyl compounds, may also be employed. The stereoregularity among mutual aromatic groups of the aromatic vinyl compound may be atactic, isotactic or syndiotactic.

The monomer copolymerizable with the aromatic vinyl compound includes butadiene, isoprene, other conjugated dienes, acrylic acid, methacrylic acid and amide derivatives or ester derivatives, maleic anhydride and its derivatives. The copolymerization mode may be any one of block copolymerization, tapered block copolymerization, random copolymerization and alternating copolymerization. Further, it may be one having the above aromatic vinyl compound graft-polymerized to a polymer made of the above-mentioned monomers, which contains at least 10 weight %, preferably at least 30 weight %, of the aromatic vinyl compound.

The above aromatic vinyl compound type polymer is required to have a weight average molecular weight of at least 30,000, preferably at least 50,000, as calculated as styrene, in order to show the performance as a practical resin.

The aromatic vinyl compound type resin to be used, may, for example, be isotactic polystyrene (i-PS), syndiotactic polystyrene (s-PS), atactic polystyrene (a-PS), rubber-reinforced polystyrene (HIPS), an acrylonitrile/butadiene/styrene copolymer (ABS) resin, a styrene/acrylonitrile copolymer (AS resin), a styrene/methacrylate copolymer such as a styrene/methyl methacrylate copolymer, a styrene/diene block/tapered copolymer (such as SBS, SIS), a hydrogenated S styrene/diene block/tapered copolymer (such as SEBS, SEPS), a styrene/diene copolymer (such as SER), a hydrogenated styrene/diene copolymer (such as hydrogenated SBR), a styrene/maleic acid copolymer, or a styrene/imidated maleic acid copolymer. Further, it is a concept including a petroleum resin.

Olefin Type Polymer

For example, low density polyethylene (LDPE), high density polyethylene (HDPE), linear low density polyethylene (LLDPE), isotactic polypropylene (i-PP), syndiotactic polypropylene (s-PP), atactic polypropylene (a-PP), a propylene/ethylene block copolymer, a propylene/ethylene random copolymer, an ethylene/propylene/diene copolymer (EPDM), an ethylene/vinyl acetate copolymer, polyisobutene, polybutene, a cyclic olefin polymer such as polynorbornene and a cyclic olefin copolymer such as an ethylene/norbornene copolymer, may be mentioned. It may be an olefin type resin co-polymerized with a diene such as butadiene or α-ω-diene, as the case requires.

The above olefin type polymer is required to have a weight average molecular weight of at least 10,000, preferably at least 30,000, as calculated as styrene, in order to show the performance as a practical resin.

Other Resins, Elastomers and Rubbers

For example, polyamide such as nylon, polyimide, polyester such as polyethylene terephthalate, polyvinyl alcohol, and a styrene type block copolymer such as SBS (styrene/butadiene block copolymer), SEBS (hydrogenated styrene/butadiene block copolymer), SIS (styrene/isoprene block copolymer), SEPS (hydrogenated styrene/isoprene block copolymer), SER (styrene/butadiene block copolymer) or hydrogenated SBR, which is not in the scope of the above aromatic vinyl compound type resin, natural rubber, a silicone resin, and silicone rubber, may be mentioned.

Fillers

Known fillers may be employed. As preferred examples, calcium carbonate, talc, clay, calcium silicate, magnesium carbonate, magnesium hydroxide, mica, barium sulfate, titanium oxide, aluminum hydroxide, silica, carbon black, wood powder and wood pulp may, for example, be mentioned. Further, glass fibers, known graphites or conductive fillers such as carbon fibers, may also be employed.

Plasticizers

Known plasticizers, such as paraffin type, naphthene type or aroma type process oils, mineral oil type softening agents such as liquid paraffin, castor oil, linseed oil, olefin type wax, mineral type wax and various esters, may be used.

For the production of the polymer composition of the present invention, a suitable known blending method may be employed. For example, melt-mixing can be carried out by means of a single screw or twin screw extruder, a Banbury mixer, a plasto mill, a co-kneader or a heated roll. Prior to the melt mixing, it is advisable to uniformly mix the respective materials by means of e.g. a Henschel mixer, a ribbon blender, a super mixer or a tumbler. The melt mixing temperature is not particularly limited, but it is usually from 100 to 300° C., preferably from 150 to 250° C.

As molding methods for various compositions of the present invention, known molding methods such as vacuum molding, injection molding, blow molding, extrusion is molding or profile extrusion molding, may be employed.

The composition containing the cross-copolymer of the present invention can be preferably used as various film or packaging materials, sheets, tubes, hoses, gaskets, and further as building materials such as floor materials or wall materials, or interior materials for automobiles.

Now, the present invention will be described with reference to Examples, but the present invention is by no means restricted to the following Examples.

The analyses of copolymers obtained in the respective Examples and Comparative Examples were carried out by the following methods.

The 13C-NMR spectrum was measured by using TMS as standard, by using a chloroform-d solvent or a 1,1,2,2-tetrachloroethane-d2 solvent, by means of α-500 manufactured by Nippon Denshi Kabushiki Kaisha. Here, the measurement using TMS as standard is the following measurement. Firstly, using TMS as standard, the shift value of the center peak of triplet 13C-NMR peaks of 1,1,2,2-tetrachloroethane-d2 was determined. Then, the copolymer was dissolved in 1,1,2,2-tetrachloroethane-d2, and the 13C-NMR was measured, whereby each peak shift value was calculated, based on the triplet center peak of 1,1,2,2-tetrachloroethane-d2. The shift value of the triplet center peak of 1,1,2,2-tetrachloroethane-d2 was 73.89 ppm. The measurement was carried out by dissolving the polymer in such solvent in an amount of 3 weight/volume %.

The 13C-NMR spectrum measurement for quantitive analysis of peak areas, was carried out by a proton gate decoupling method having NOE erased, by using pulses with a pulse width of 45° and a repeating time of 5 seconds as standard.

When the measurement was carried out under the same conditions except that the repeating time was changed to 1.5 seconds, the measured values of peak areas of the copolymer agreed to the values obtained in the case where the repeating time was 5 seconds, within measurement error.

The styrene content in the copolymer was determined by 1H-NMR. As the apparatus, α-500 manufactured by Nippon Denshi Kabushiki Kaisha and AC-250 manufactured by BRUCKER COMPANY, were employed. The determination was carried out at a temperature of from 80 to 100° C. by dissolving a sample in 1,1,2,2-tetrachloroethane-d2 and comparing the intensity of the proton peak attributable to a phenyl group (6.5 to 7.5 ppm) and the proton peak attributable to an alkyl group (0.8 to 3 ppm), measured by using TMS as standard.

The diene (divinylbenzene) content was measured by 1H-NMR.

As the molecular weights in Examples, weight average molecular weights as calculated as standard polystyrene, were obtained by means of GPC (Gel Permeation Chromatography).

A copolymer soluble in THF at room temperature, was measured by means of HLC-8020 manufactured by TOSOH CORPORATION using THF as the solvent.

A copolymer insoluble in THF at room temperature, was measured either at 135° C. by means of 150CV apparatus manufactured by Waters Company using 1,2,4-trichlorobenzene as the solvent, or at 145° C. by means of HLC-8121 apparatus manufactured by TOSOH CORPORATION using o-chlorobenzene as the solvent. As the detector, RI (differential refractive index meter) was used. With cross-copolymers in Examples, the refractive index to o-dichlorobenzene as the solvent is reversed between the main chain component and the cross chain component. Accordingly, the molecular weight of a cross-copolymer obtained by the RI detector is not accurate and is useful only as a reference value.

The DSC measurement was carried out by using DSC 200 manufactured by Seiko Denshi K. K. in a nitrogen stream at a temperature raising rate of 10° C./min. Using 10 mg of a sample, it was heated to 240° C. at a temperature raising rate of 20° C./min and quenched to −100° C. or lower by liquid nitrogen (pretreatment), and then the temperature was raised from −100° C. at a rate of 10° C./min to carry out the DSC measurement up to 240° C., whereby the melting point, the heat of crystal fusion and the glass transition point were obtained. The glass transition point was obtained by a tangent method.

As a sample for evaluation of the physical properties, a sheet having thickness of 1.0 mm formed by a heat-pressing method (temperature: 180° C., time: 3 minutes, pressure: 50 kg/cm$^2$) was used.

Tensile Test

In accordance with JIS K-6251, the sheet was cut into a shape of test piece No. 1, and measured at a tensile speed of 500 mm/min by means of AGS-100D model tensile tester manufactured by Shimadzu Corporation.

Permanent Elongation

The strain recovery in a tensile test was measured by the following method.

Using the JIS No. 2 small size (½) test piece, it was pulled by a tensile tester to a strain of 100% and maintained for 10 minutes, whereupon the stress was quickly released (without repulsion) and the strain recovery after 10 minutes was represented by %.

Vicat Softening Point

A sheet having a thickness of 4 mm was prepared by a heat pressing method, and a test specimen of 10 mm×10 mm was cut out. In accordance with LIS K-7206, it was measured under a load of 320 g at an initial temperature of 40° C. under a temperature raising condition of 50° C./hr using & VSPT tester S3-FH, manufactured by Toyo Seiki.

Measurement of Dynamic Viscoelasticity

Using a dynamic viscoelasticity measuring apparatus (RSA-II, manufactured by Rheometrix Company), the loss tan δ was measured at a frequency of 1 Hz within a temperature range of from −120° C. to +150° C. (the measuring temperature range was slightly changed depending upon the properties of the sample). From a sheet having a thickness of 0.1 mm prepared by heat pressing, a sample for measurement (3 mm×40 mm) was obtained.

X-ray Diffraction

The X-ray diffraction was measured by MXP-18 model high power X-ray diffraction apparatus, manufactured by Mac Science Company employing as the ray source a Cu sealed counter cathode (wavelength: 1.5405 Å).

Hardness

With respect to the hardness, durometer hardness of types A and D was obtained in accordance with the test method for durometer hardness of plastics as prescribed in JIS K-7215. This hardness is an instantaneous value.

Total Light Transmittance, Haze

With respect to the transparency, the total light transmittance and the haze were measured by means of turbidity meter NDH2000, manufactured by Nippon Denshoku Kogyo K. K. in accordance with the test method for optical characteristics of plastics as prescribed in JIS K-7105 with respect to a sheet having a thickness of 1 mm molded by heat pressing (temperature: 200° C., time: 4 minutes, pressure: 50 kg/cm$^2$G).

Divinylbenzene

The divinylbenzene (a mixed product of m-isomer and p-isomer) used in the following Examples 1 to 3 relating to the cross-copolymer was manufactured by Aldrich Company (purity as divinylbenzene: 80%, a mixture of m-isomer and p-isomer, weight ratio of meta-form:para-form=70:30, accordingly, the isomer purity of m-divinylbenzene is 70 weight %). In the following polymerization, when 1 ml (5.5 mmol as divinylbenzene) was used per 400 ml of styrene, the amount of divinylbenzene corresponds to 1/640 of the amount of styrene by molar ratio.

Catalyst (Transition Metal Compound)

In the following Examples, as a transition metal compound (catalyst), rac-dimethylmethylenebis(4,5-benzo-1-indenyl)zirconium dichloride, (rac-isopropylidenebis(4,5-benzo-1-indenyl) zirconium dichloride) was employed.

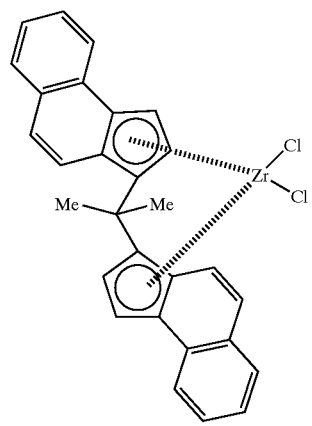

rac-dimethylmethylenebis(4,5-benzo-1-indenyl)zirconium dichloride

EXAMPLE 1

Preparation of a Cross-Copolymerized Ethylene/Styrene/Divinylbenzene Copolymer

Using rac-dimethylmethylenebis (4,5-benzo-1-indenyl) zirconium dichloride as a catalyst, the preparation was carried out as follows.

Polymerization was carried out by means of an autoclave having a capacity of 10 l and equipped with a stirrer and a jacket for heating and cooling, 4400 ml of toluene, 400 ml of styrene and 1.0 ml of divinylbenzene manufactured by Aldrich Company were charged and heated and stirred at an internal temperature of 70° C., About 200 l of nitrogen was bubbled to purge the interior of the system and the polymerization solution. 8.4 mmol of triisobutyl aluminum and 21 mmol, based on Al, of methyl alumoxane (PMAO-3A, manufactured by TOSOH AKZO K. K.) were added, and ethylene was immediately introduced. After the pressure was stabilized at 0.25 MPa (1.5 kg/cm$^2$G), from a catalyst tank installed above the autoclave, about 50 ml of a toluene solution having 8.4 μmol of rac-dimethylmethylenebis (4,5-benzo-1-indenyl) zirconium dichloride and 0.84 mmol of triisobutyl aluminum dissolved therein, was added to the autoclave. Polymerization (the first polymerization step) was carried out for 45 minutes while maintaining the internal temperature at 70° C. and the pressure at 0.25 MPa. At this stage, the amount of ethylene consumed was about 100 l in a standard state. A part of the polymerization solution was sampled, and a polymer sample (polymer 1-A) of the first polymerization step was obtained by precipitation from methanol. Ethylene was introduced rapidly, and the internal pressure was brought to 1.1 MPa in 25 minutes. By the increase of the ethylene pressure, polymerization was accelerated, whereby the internal temperature rose from 70° C. up to 80° C. While maintaining the pressure at 1.1 MPa, polymerization was carried out for 70 minutes (the second polymerization step).

After completion of the polymerization, the obtained polymer solution was introduced in small portions into a large amount of a methanol solution which was vigorously stirred, to recover the polymer. This polymer was dried in air at room temperature for one day, and then, dried under vacuum at 80° C. until change in weight was no longer observed. 805 g of the polymer (polymer 1-C) was obtained.

The polymerization conditions in the respective examples were summarized in Table 1.

The analytical results of the polymers obtained in the respective Examples and Comparative Examples are shown in Table 2.

TABLE 1

Polymerization Conditions

First polymerization step (main chain polymerization step)

| Ex. | Catalyst μmol | MAO mmol | St ml | DVB ml | Toluene ml | Et pressure MPa | Polymerization temperature ° C. | Et consumption amount l | Polymerization time (min.) | Conversion (%) in first polymerization step % |
|---|---|---|---|---|---|---|---|---|---|---|
| Ex. 1 | 8.4 | P;21 | 400 | 1.0 | 4400 | 0.25 | 70 | About 100 | 64 | 38 |
| Ex. 2 | 8.4 | P;21 | 400 | 1.0 | 4400 | 0.25 | 70 | About 150 | 96 | 45 |
| Ex. 3 | 8.4 | P;21 | 400 | 1.0 | 4400 | 0.25 | 70 | About 200 | 150 | 60 |

Second polymerization step (cross chain polymerization step)

| ET pressure MPa | Polymerization temperature ° C. | Et consumption amount l | Polymerization time (min.) | St conversion (%) in second polymerization step Note 1 | Final St conversion (%) |
|---|---|---|---|---|---|
| 1.1 | 70–80 | About 300 | 77 | 56 | 73 |
| 1.1 | 70–80 | About 370 | 81 | 56 | 75 |
| 1.1 | 70–90 | About 260 | 65 | 22 | 68 |

Note 1: St conversion (%) in second polymerization step; ratio of the amount of styrene monomer converted to polymer during second polymerization step, to the amount of styrene monomer present in polymerization solution at the initiation of second polymerization step. (A styrene monomer amount in a polymerization solution present at the initiation of second polymerization step was determined by taking a part of a polymer solution obtained in first polymerization step and measuring weight balance from its polymer concentration and composition.)
Note 2: Final St conversion (%); ratio of the amount of styrene monomer finally converted to polymer through first and second polymerization steps, to the amount of styrene monomer initially charged.

TABLE 2

Polymerization Results

| Ex. | Polymers | Yield 1) g | Styrene content mol % | Mw/$10^4$ | Mw/Mn | Glass transition temperature ° C. | Melting point ° C. | Heat of crystal fusion J/g |
|---|---|---|---|---|---|---|---|---|
| Ex. 1 | 1-A | 260 | 23.0 | 16.0 | 2.4 | −18 | None | — |
|  | 1-B | 545 | 7.6 | — | — | — | — | — |
|  | 1-C | 805 | 11.6 | (15.7) | (4.7) | −20 | 103 | 35 |
| Ex. 2 | 2-A | 352 | 19.1 | 19.9 | 2.8 | −18 | 48 | 17 |
|  | 2-B | 543 | 6.5 | — | — | — | — | — |
|  | 2-C | 895 | 10.7 | (17.9) | (4.8) | −20 | 106 | 34 |
| Ex. 3 | 3-A | 470 | 18.9 | 19.4 | 2.9 | −20 | 53 | 23 |
|  | 3-B | 393 | 2.3 | — | — | — | — | — |
|  | 3-C | 863 | 9.8 | (21.7) | (4.1) | −21 | 109 | 83 |

A value of polymer A was determined from a polymer obtained by sampling a part of a polymerization solution at the end of first polymerization step.
Polymer B (1-B, 2-B and 3-B) is a copolymer obtained in second polymerization step (cross chain polymerization step) (including a copolymer component formed during raising an ethylene pressure).
Polymer C (1-C, 2-C and 3-C) is a cross-copolymer finally obtained through the first and second polymerization steps.
Yield and styrene content of polymer B were determined from weight balance of polymer A and polymer C.
Styrene content of polymer B is an average styrene content of a copolymer obtained in second polymerization step.
Mw or Mw/Mn in the brackets ( ) is a reference value.

In Table 2, in addition to the polymer (1-A) obtained in the first polymerization step and the cross-copolymer i.e. the polymer (1-C) finally obtained through the second polymerization step, the weight and the composition of the polymer (1-B) polymerized in the second polymerization step are also shown as determined from weight balance.

EXAMPLES 2 AND 3

Under the conditions shown in Table 1, polymerization and post treatment were carried out in the same manner as in Example 1. By the gas chromatography analysis of the polymerization solution withdrawn upon completion of the first polymerization step, the amount of divinylbenzene remaining in the polymerization solution was obtained, and the amount of divinylbenzene consumed in the first polymerization step was obtained. From the value, the divinylbenzene content in the copolymer obtained in each first polymerization step was obtained, whereby it was about 0.04 mol % with polymer 1-A, about 0.04 mol % with polymer 2-A and about 0.07 mol % with polymer 3-A.

The structural index λ of the cross-copolymer obtained in each Example and the isotactic diad index m of the styrene unit/ethylene unit alternating structure, were obtained in accordance with the above formulae (i) and (ii), respectively. λ values and m values obtained in Examples are shown in Table 3, and other results of measurements are shown in tables 4 and 5.

TABLE 3

| Examples | St content mol % | λ value | m value |
|---|---|---|---|
| Example 1 1-A | 23.0 | 16 | >0.95 |
| Example 1 1-C | 11.6 | 10 | >0.95 |
| Example 2 2-A | 19.1 | 14 | >0.95 |
| Example 2 2-C | 10.7 | 8 | >0.95 |
| Example 3 3-A | 19.1 | 15 | >0.95 |
| Example 3 3-C | 9.8 | 8 | >0.95 |

TABLE 4

| | Example 1 | Example 2 | Example 3 |
|---|---|---|---|
| Kind of polymer | 1-C | 2-C | 3-C |
| Breaking elongation (%) | 517 | 500 | 500 |
| Yield strength (MPa) | Yield point was not observed | Yield point was not observed | Yield point was not observed |
| Breaking strength (MPa) | 34.9 | 35.8 | 31.2 |
| Elastic modulus in tension (MPa) | 29.5 | 29.2 | 38 |
| 100% modulus (MPa) | 6.0 | 5.3 | 6.7 |
| 300% modulus (MPa) | 10.0 | 9.7 | 9.8 |
| Hardness (Shore A) | 88 | 88 | 90 |
| Hardness (Shore D) | 39 | 36 | 39 |
| Total light transmittance (%) | 80 | 83 | 81 |
| Haze (%) | 15 | 13 | 17 |
| Vicat softening point (° C.) | 96 | 95 | 95 |
| MFR (g/10 min.) 200° C. | 0.13 | 0.06 | Unmeasured |

TABLE 5

| | Gel content of polymer |
|---|---|
| Example 1 (1-A) | 0% |
| Example 1 (1-C) | 0% |
| Example 2 (2-A) | 0% |
| Example 2 (2-C) | 0% |
| Example 3 (3-A) | 0% |
| Example 3 (3-C) | 0% |

In the Table, "0%" means "less than 0.1%".

Comparative Examples 1 to 6

Ethylene/styrene copolymers having various styrene contents obtained by polymerization carried out in the method disclosed in EP-0872492A2 and JP-A-11-130808 using rac-dimethylmethylenebis (4,5-benzo-1-indenyl) zirconium dichloride as a catalyst and methyl alumoxane (MAO) as a cocatalyst, are shown in Table 6.

TABLE 6

| | | St content mol % | $Mw/10^4$ | Mw/Mn | Melting point ° C. | Glass transition point ° C. |
|---|---|---|---|---|---|---|
| Comparative Example 1 | R-1 | 5 | 18.5 | 2.1 | 103 | −25 |
| Comparative Example 2 | R-2 | 7 | 18.0 | 2.0 | 93 | −28 |
| Comparative Example 3 | R-3 | 11 | 16.0 | 1.9 | 79 | −22 |
| Comparative Example 4 | R-4 | 13 | 22.7 | 2.0 | 68 | −23 |
| Comparative Example 5 | R-5 | 17 | 17.5 | 2.0 | 63 | −22 |
| Comparative Example 6 | R-6 | 21 | 18.5 | 2.0 | Unmeasured | Unmeasured |

Comparative Example 7

Using a Brabender Plasti-Corder (PLE331 Model, manufactured by Brabender Company), 25 g of each of copolymers R-2 and R-6 was melted, and then kneading (external temperature: 180° C., rotational speed: 60 RPM, time: 10 minutes) was carried out to obtain a composition. The obtained ethylene/styrene copolymer composition was molded by the above-mentioned press molding to obtain a sheet of 1 mm in thickness, and evaluation of various physical properties was carried out. In Tables 7 and 8, the test results of the physical properties of the polymers of Comparative Examples and various polymers obtained, are shown.

TABLE 7

| Kind of polymer | Comp Ex. 1 R-1 5 mol % | Comp Ex. 2 R-2 7 mol % | Comp Ex. 3 R-3 11 mol % | Comp Ex. 4 R-4 13 mol % | Comp Ex. 5 R-5 17 mol % | Comp Ex. 6 R-6 21 mol % | Comp. Ex. 7 R-2 + R-6 |
|---|---|---|---|---|---|---|---|
| Breaking elongation (%) | 630 | 533 | 450 | 440 | 500 | 1333 | 533 |
| Yield strength (MPa) | Yield point was not observed | Yield point was not observed | Yield point was not observed | Yield point was not observed | Yield point was not observed | Yield point was not observed | Yield point was not observed |
| Breaking strength (MPa) | 34.0 | 50.0 | 45.0 | 36.0 | 48.0 | 7.6 | 34.3 |
| Elastic modulus in tension (MPa) | 66.0 | 34.0 | 18.0 | 17.0 | 9.0 | 3.1 | 14.5 |
| 100% Modulus (MPa) | 9.0 | 6.0 | 5.0 | 4.0 | 3.0 | 1.3 | 3.8 |
| 300% Modulus (MPa) | 11.0 | 10.0 | 9.0 | 8.0 | 6.0 | 1.6 | 3.9 |
| Hardness (Shore A) | 96 | 94 | 84 | 82 | 78 | 63 | 82 |
| Hardness (Shore D) | 47 | 44 | 31 | 30 | 25 | 19 | 31 |
| Total light transmittance (%) | 80 | 85 | 82 | 86 | Unmeasured | 84 | 73 |
| Haze (%) | 20 | 13 | 22 | 12 | Unmeasured | 12 | 47 |
| Vicat softening point (° C.) | 99 | 94 | 77 | 70 | 61 | 40 | 76 |

TABLE 8

| | Example 4 | Example 5 | Example 6 | Example 7 | Comparative Example 8 |
|---|---|---|---|---|---|
| Cross-copolymer | 2-C 100 parts | 2-C 100 parts | 2-C 100 parts | 2-C 100 parts | — |
| Et-St copolymer | — | — | — | — | R-3 100 parts |
| Stabilizer (Irganox-1010) | 0.3 part | 0.3 part | 0.3 part | 0.3 part | 0.3 part |
| Plasticizer (naphthene type oil) NS-100 | — | — | 20 parts | 50 parts | — |
| Plasticizer (paraffin type oil) PW-380 | — | 50 parts | — | — | — |
| Polypropylene K-7714 | — | — | — | 50 parts | — |
| Breaking elongation (%) | 540 | 650 | 680 | 670 | Unmeasured |
| Breaking strength (MPa) | 30 | 10 | 17 | 9 | Unmeasured |
| Hardness (Shore A) | 88 | 73 | 79 | 87 | Unmeasured |
| C-set (%) | 67 | 54 | 59 | 65 | 93 |

It is evident that the cross-copolymerized styrene/ethylene/divinylbenzene copolymers of the Examples of the present invention have high mechanical strengths, high melting points, Vicat Softening points and transparency. When the physical properties are compared with ethylene/styrene copolymers having the same compositions (styrene contents), they show higher melting points and Vicat softening points and show equivalent transparency. The melting points and the Vicat softening points of the cross-copolymers of the Examples of the present invention have values substantially equal to or higher than ethylene/styrene copolymers having the same styrene contents as the cross chain component polymerized in the second polymerization step (the crossing step). Namely, cross-copolymer (1-C) obtained in Example 1 has an average styrene content of 11.6 mol %, and, nevertheless, its melting point and its Vicat softening point are substantially equal to or higher than the ethylene/styrene copolymer (R-1 or R-2) having a styrene content of 5 or 7 mol %. Whereas, shore hardness A and D and the elastic modulus in tension are lower than R-1 or R-2, which is considered to be attributable to the effects of the main chain component (the component obtained in the first polymerization step) having a high styrene content of the cross-copolymer.

Figure 3:
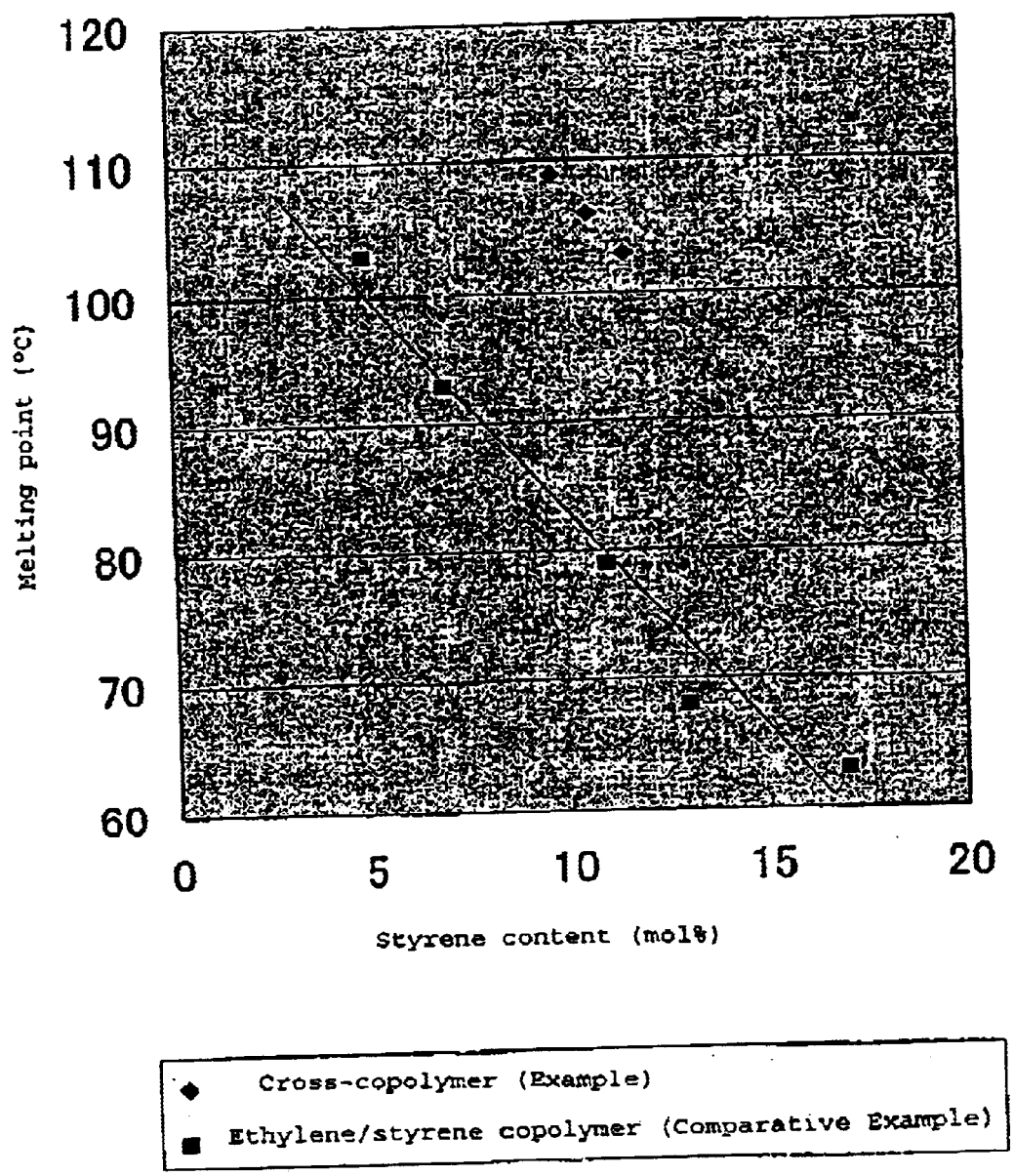
FIG. 3 is a graph showing the relation between the melting points and the compositions of cross-copolymers of Examples 1 to 3 of the present invention and ethylene/styrene copolymers.

FIG. 3 shows the relation between the styrene content and the DSC melting point of the cross-copolymers obtained in the Examples of the present invention and the ethylene/styrene copolymers of the Comparative Examples.

Figure 4:
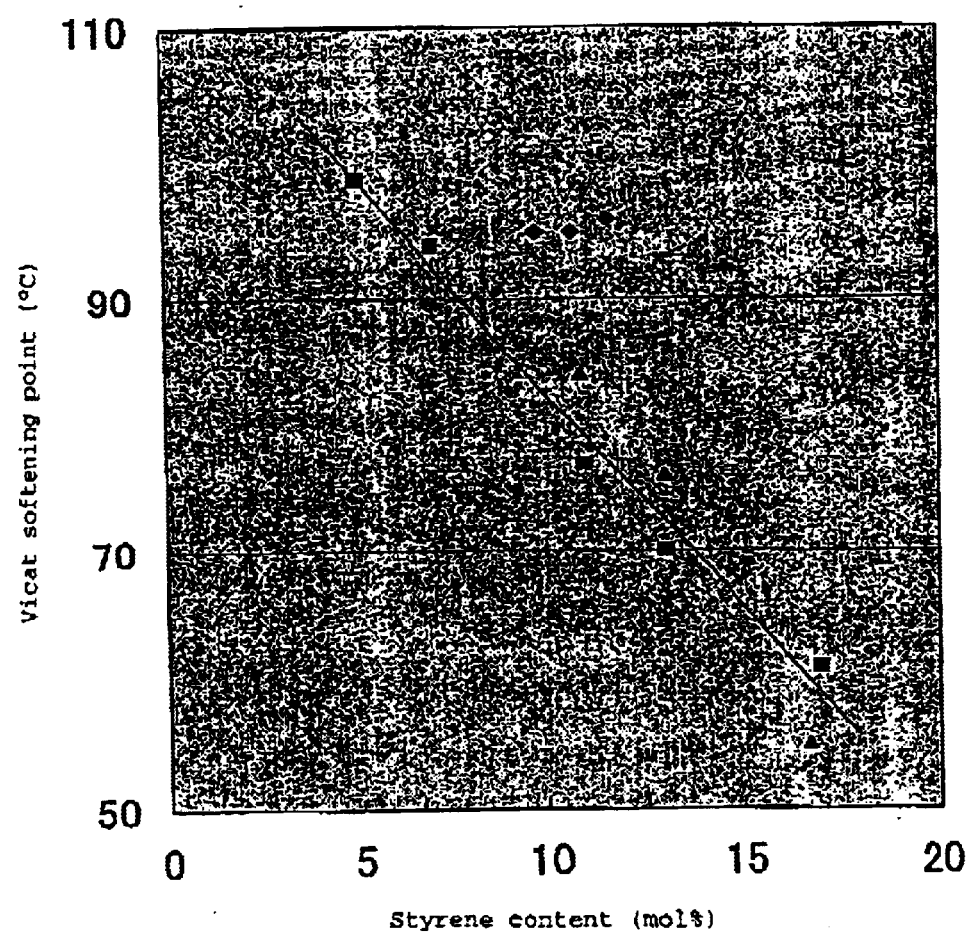
FIG. 4 is a graph showing the relation between the Vicat softening points and the compositions of cross-copolymers of the present invention, ethylene/styrene copolymers and blends of ethylene/styrene copolymers.

Further, FIG. 4 shows a relation between the styrene content and the vicat softening point of the cross-copolymers obtained in the Examples of the present invention, the ethylene/styrene copolymers of Comparative Examples and the blend product obtained by mixing the ethylene/styrene copolymers of Comparative Examples by a Brabender. It is evident that the cross-copolymers of the Examples of the present invention have higher Vicat softening points as compared with the ethylene/styrene copolymers or the blend product of the ethylene/styrene copolymers. The blend products obtained by mixing the ethylene/styrene copolymers of Comparative Examples by a Brabender, in FIG. 4, are a blend product of R-2 and R-6 in Table 7 (weight ratio of 1:1, average styrene content: 13 mol %), a blend product of R-2 and R-4 (weight ratio of 1:1, average styrene content: 11 mol %), and a blend product of R-4 and R-6 (weight ratio of 1:1, average styrene content: 17 mol %).

As a Comparative Test, ethylene/styrene copolymers (R-2 and R-6) having styrene contents close to the main chain and the cross chain of cross-copolymer (1-C) were kneaded in a weight ratio of 1:1 to obtain a composition. The obtained composition was opaque as shown in the table. It is evident that in the case of a composition of ethylene/styrene copolymers substantially different in their compositions (for example, different in the styrene content by at least 10 mol %), the transparency deteriorates, as the compatibility is poor.

Further, the cross-copolymerized styrene/ethylene/diene copolymers obtained in the Examples of the present invention show good processabilities (MFR, the MFR measured under a load of 5 kg at 200° C. is at least 0.02 g/10 min.).

The gel content of the cross-copolymer was measured in accordance with ASTM D-2765-84. Namely, accurately weighed 1.0 g of a polymer (a molded product having a diameter of about 1 mm and a length of about 3 mm) was enclosed in a 100 mesh stainless steel net bag and accurately weighed. This was extracted in boiling xylene for about 5 hours, whereupon the net bag was recovered and dried under vacuum at 90° C. for at least 10 hours. After cooling sufficiently, the net bag was accurately weighed, and the amount of the polymer gel was calculated by the following formula.

Gel amount=weight of polymer remaining on the net bag/weight of initial polymer×100

The results are shown in Table 6. In each case, the gel content was 0% (measurable lower limit: 0.1 weight %), which shows that the cross-copolymers of the present invention have extremely low gel contents and crosslinking degrees.

This is explained in such a way that the coordination polymerization catalyst used in the Examples of the present invention is capable of copolymerizing dienes at high efficiency, and crossing will adequately proceed at a very low level of the amount of dienes used. It is considered that the amount and the concentration of the diene remaining in the polymerization solution are sufficiently low, whereby crosslinking at the diene units of the copolymer during the polymerization can be suppressed to an extremely low level, whereby formation of the gel component will be suppressed.

Also in the crossing step, formation of the gel component is suppressed as the amount and concentration of the remaining diene are low.

Figure 5:
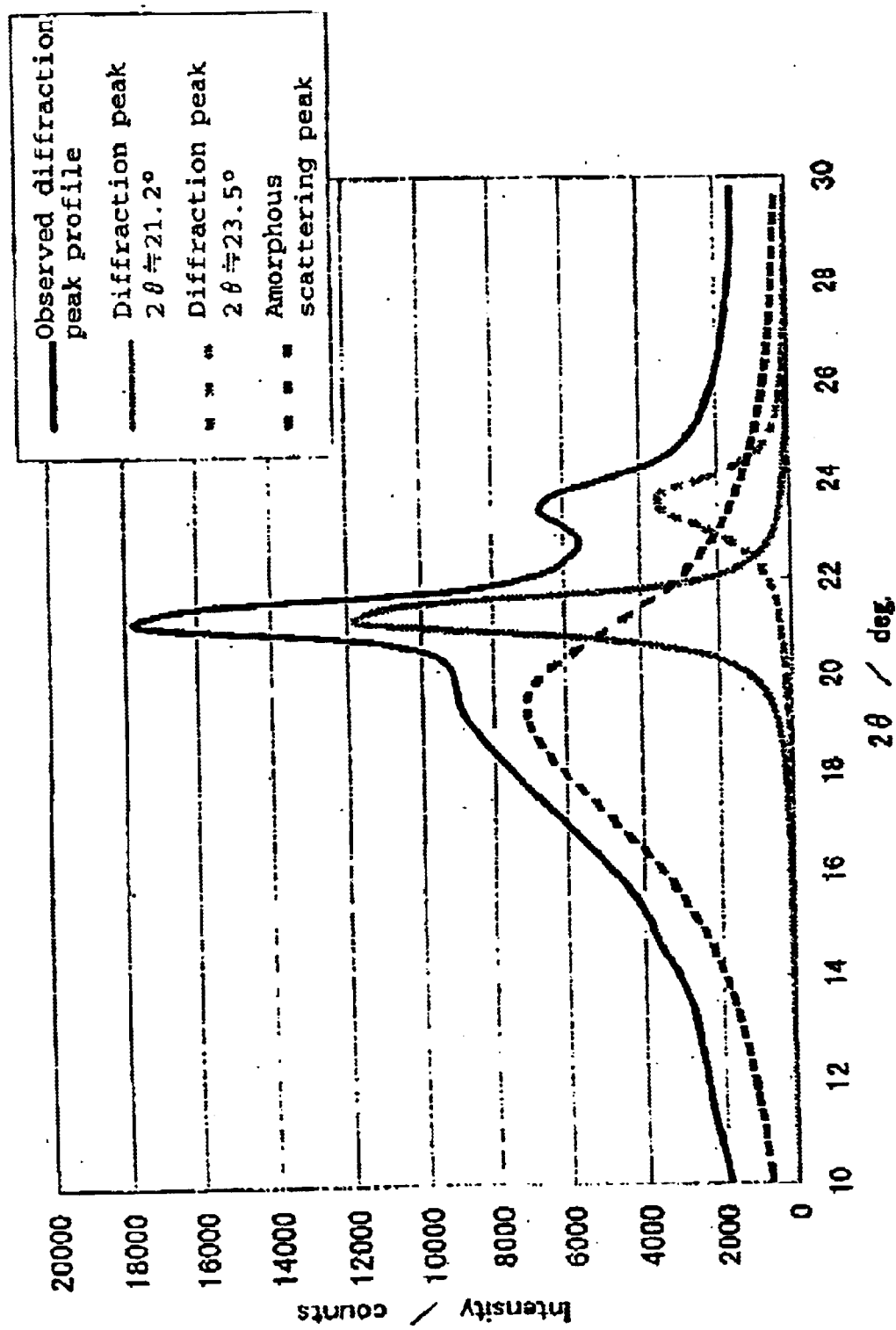
FIG. 5 shows an X-ray diffraction diagram and a multiple peak separation results of a cross-copolymer of the present invention.

By the X-ray diffraction, a crystal structure derived from ethylene chains was confirmed with the cross-copolymers of the Examples of the present invention i.e. polymer (1-C), polymer (2-C) and polymer (3-C). The X-ray diffraction diagram of polymer (1-C) is shown in FIG. 5. Peaks attributable to the polyethylene crystal structure are clearly observed in the vicinity of 2θ=21° or 24°. Amorphous scattering peaks and diffraction peaks are subjected to peak separation to obtain peak areas (peak integrated intensities), and the crystallinity was obtained by the following formula.

Crystallinity (%)=100×(sum of integrated intensities of crystalline diffraction peaks)/(sum of integrated intensities of crystalline diffraction peaks and amorphous scattering peaks)

As a result, the crystallinity of cross-copolymer (1-C) was 30%.

Figure 6:
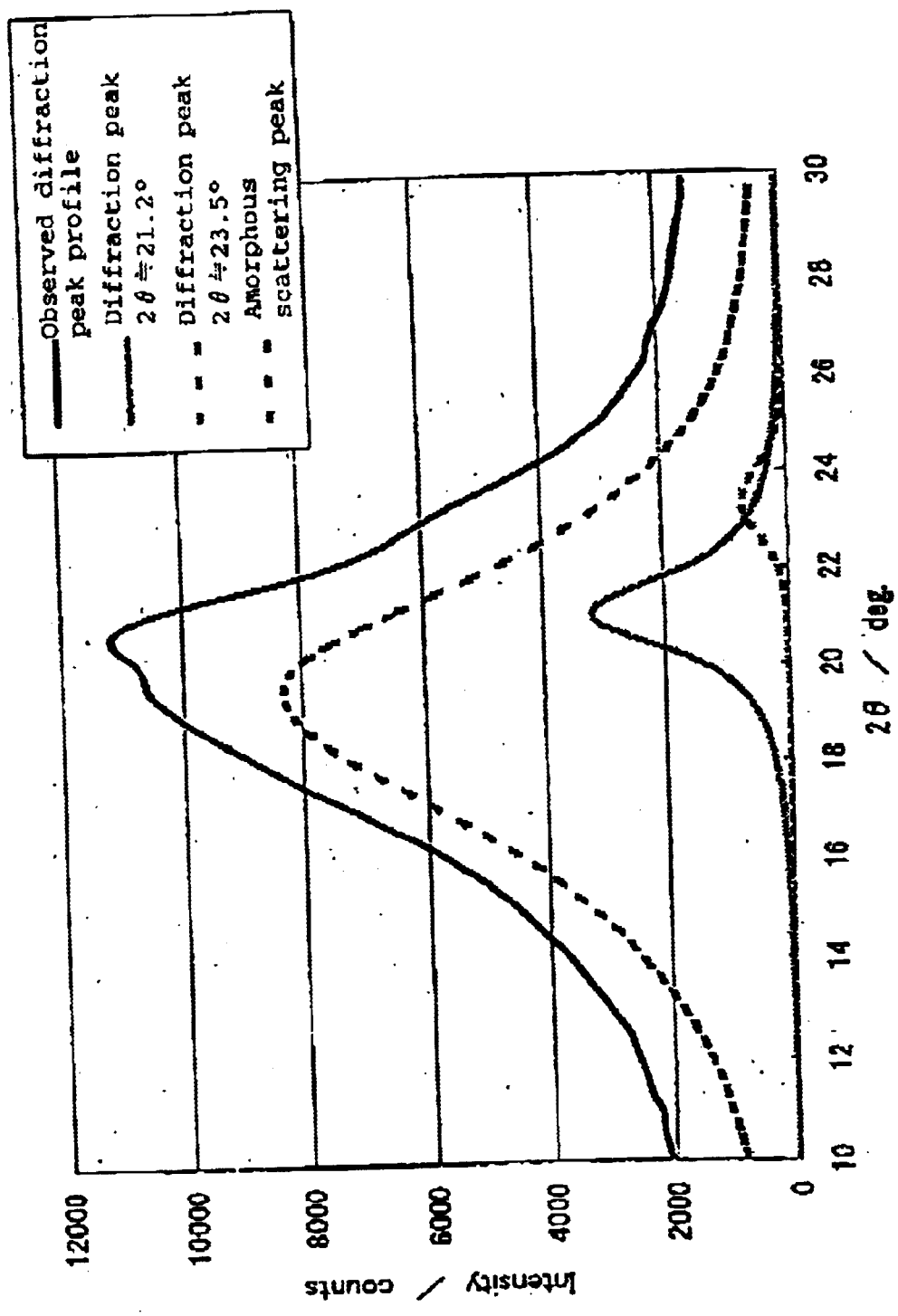
FIG. 6 is an X-ray diffraction diagram and a multiple peak separation result of an ethylene/styrene copolymer.

As a Comparative Example, the X-ray diffraction diagram of ethylene/styrene copolymer (R-4) having substantially the same styrene content, is shown in FIG. 6. As compared with the cross-copolymer, the peak intensity attributable to the polyethylene crystal structure is low, and its crystallinity was 14%.

The brittle temperatures of the cross-copolymers of the Examples of the present invention were measured in accordance with JIS K-6723 and K-7216. As a result, cross-copolymers 1-C and 2-C both showed brittle temperatures of not higher than −60° C. A transparent soft polyvinyl chloride compound (Vinikon S2100-50, manufactured by Denki Kagaku K. K.) showed a brittle temperature of substantially −25° C.

Figure 7:
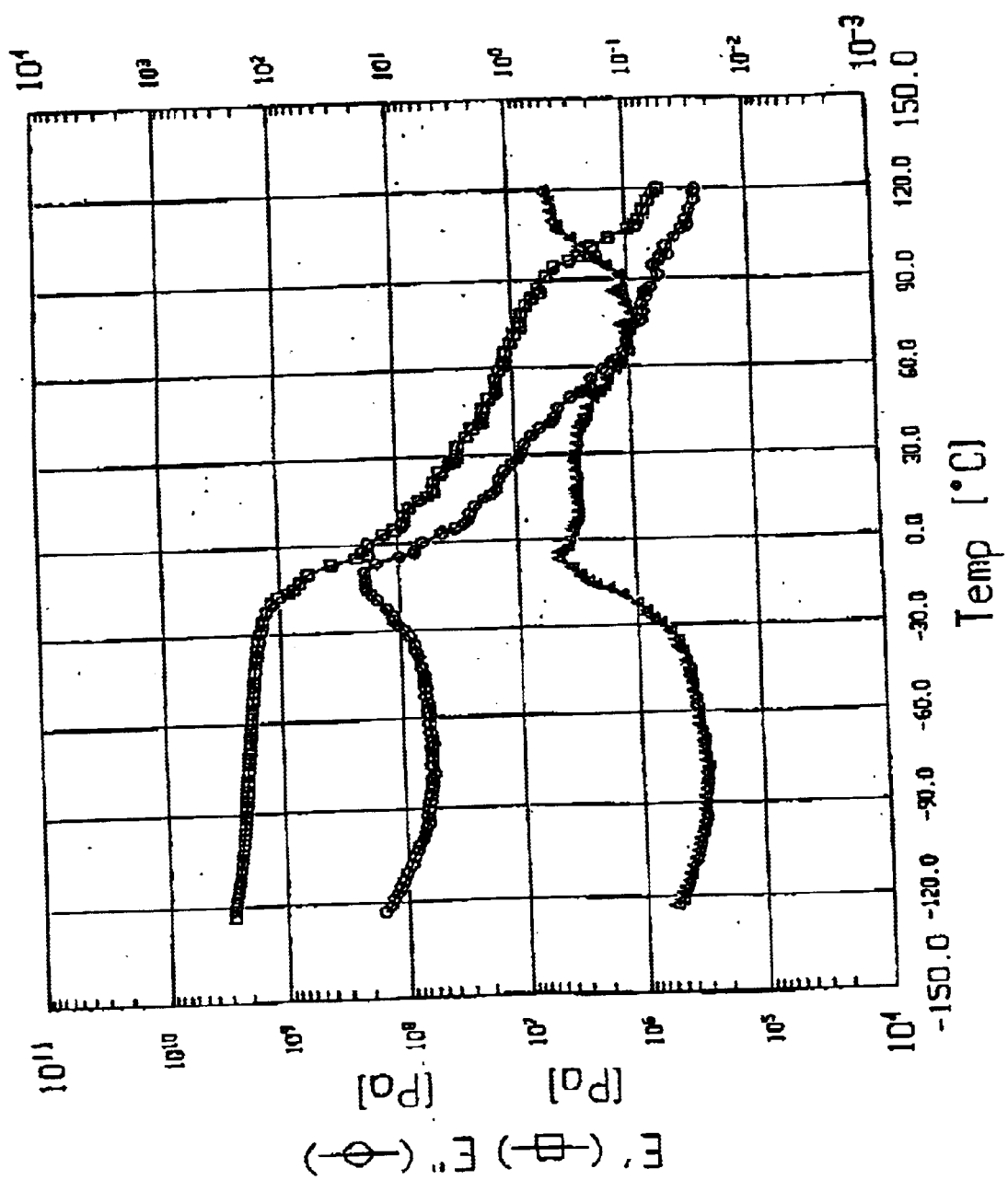
FIG. 7 is a viscoelasticity spectrum of cross-copolymer (1-C).
Figure 8:
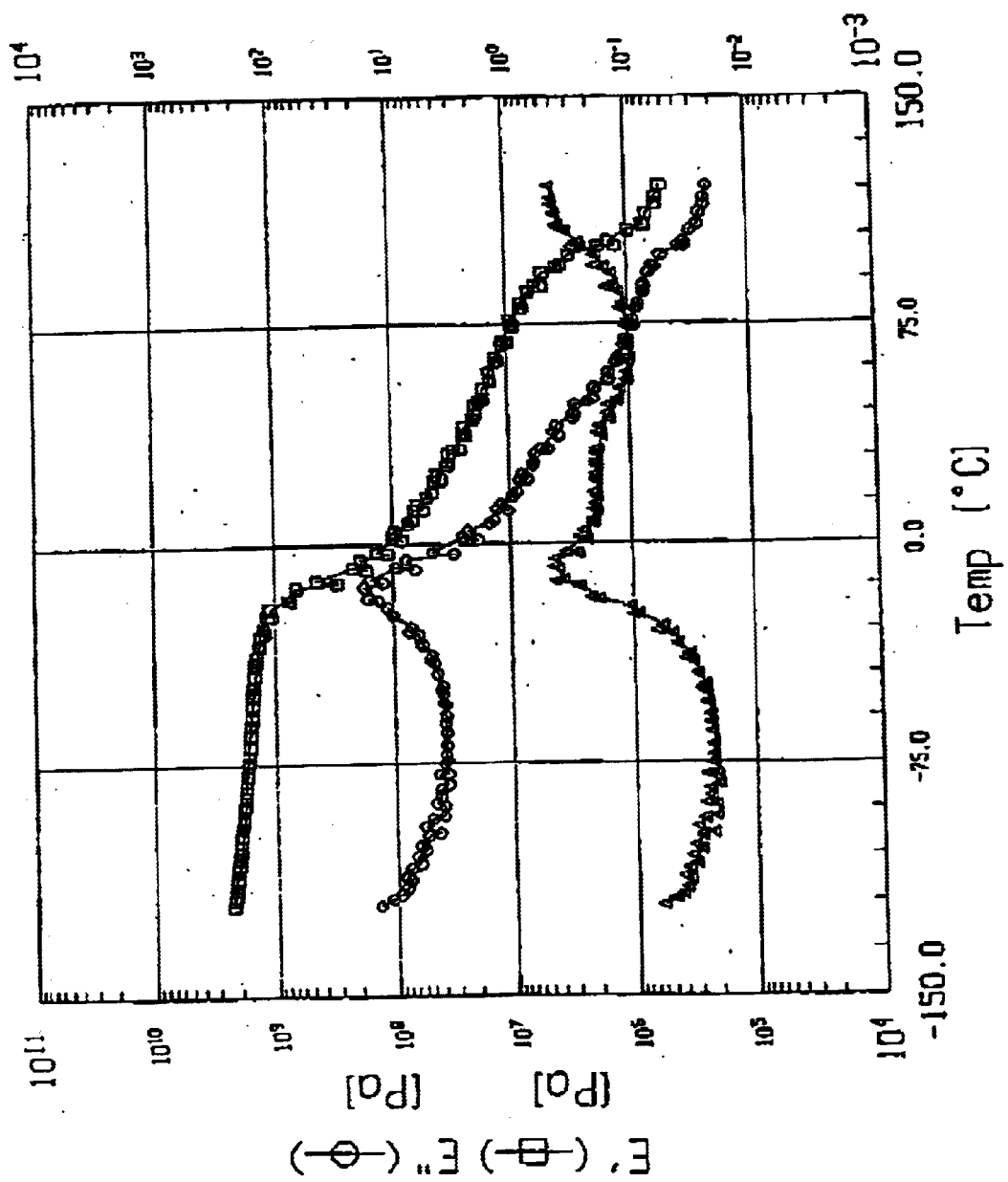
FIG. 8 is a viscoelasticity spectrum of cross-copolymer (2-C).
Figure 9:
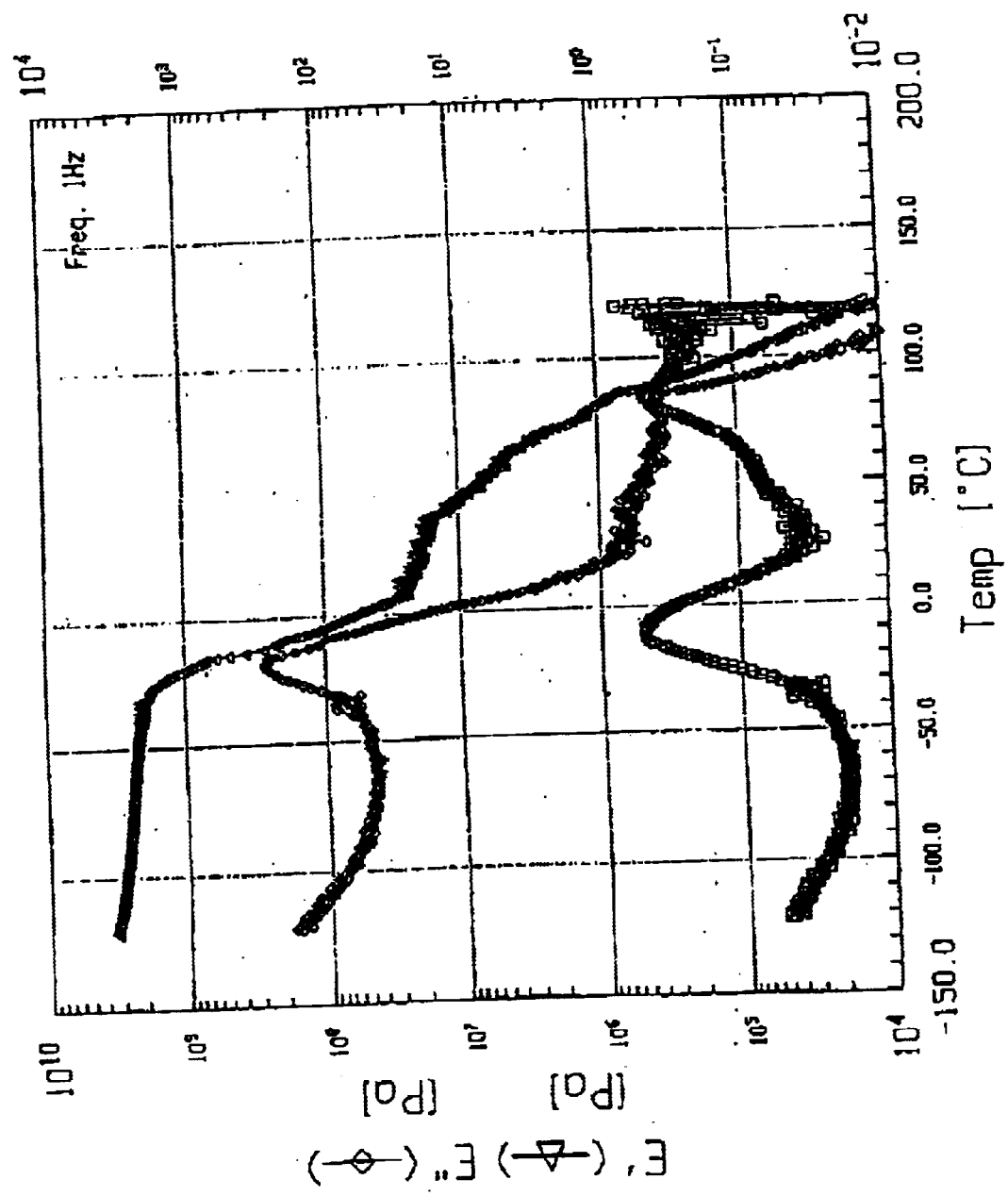
FIG. 9 is a viscoelasticity spectrum of an ethylene/styrene copolymer having a styrene content of 11 mol %.
Figure 10:
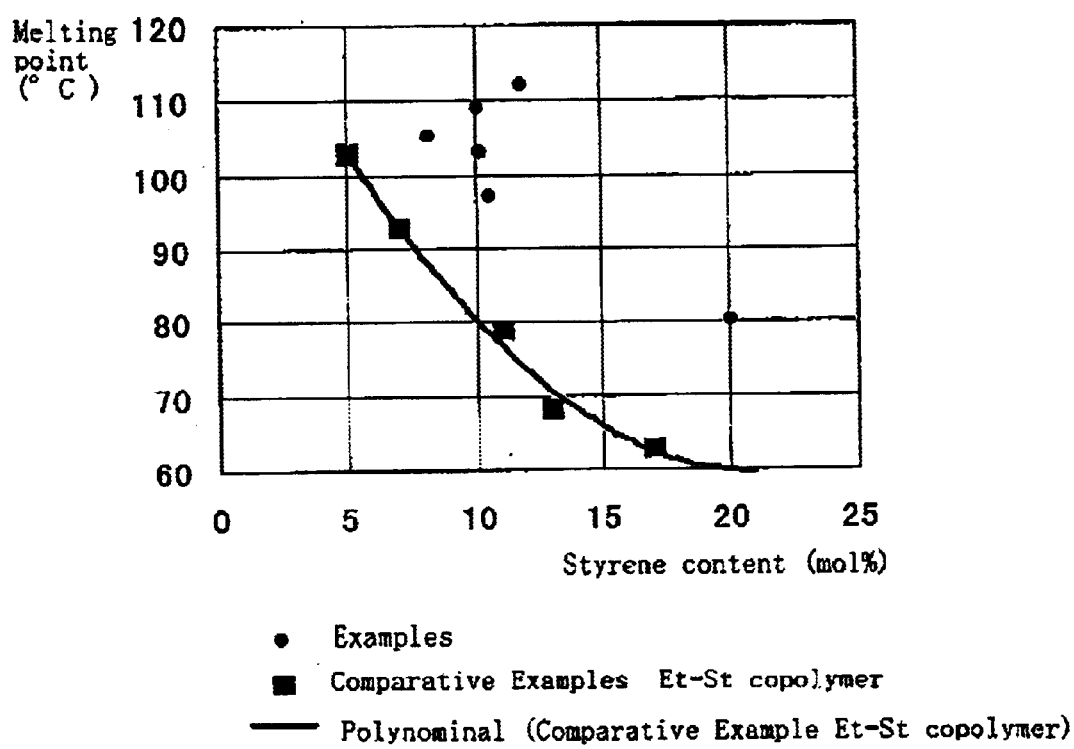
FIG. 10 is a graph showing the relation between the melting points and the compositions of cross-copolymers of Examples 8 to 13 of the present invention and ethylene/styrene copolymers.

FIGS. 7 and 8 show the viscoelasticity spectra (measured at 1 Hz) of the films of the cross-copolymers obtained in Examples 1 and 2. Further, FIG. 9 shows the viscoelasticity spectrum of the ethylene/styrene copolymer composition of a Comparative Example. E' (storage elastic modulus) of the cross-copolymer of the Example of the present invention shows a high value especially at a temperature of at least 50° C., as compared with the ethylene/styrene copolymer having the same styrene content. Further, E' shows a value higher than $10^6$ Pa at 100° C., and the temperature at which it lowers to $10^6$ Pa, is about 105° C., which is high as compared with about 80° C. of the ethyleneostyrene copolymer, thus indicating that it has high heat resistance.

It is evident that the cross-copolymer of the Example of the present invention has a tan δ peak component of from 0.05 to 0.8 at about room temperature (0° C. or 25° C.). Further, it has a wide range of tan δ peaks from about −30° C. to about 50° C. Specifically, the tan δ value is at least 0.1 within a temperature range of from −10° C. to 50° C.

The copolymer of the present invention or a film made of the copolymer of the present invention has such characteristics of E' and tan δ value, and flexibility or softness such that hardness A is from 60 to 90 and/or the elastic modulus in tension is from 10 MPa to 40 MPa.

Measurement of C-Set

Using Brabender Plasti-Corder (PLE 331 model, manufactured by Brabender Company), the polymer was melted and then kneaded in a blend as shown in Table 8 at 200° C. at 60 rpm for 10 minutes to obtain a sample. The sample was press-molded, and the physical properties were measured. Further, in accordance with JIS K6262, a high temperature compression permanent deformation (C-set) after heat treatment under pressure at 70° C. for 24 hours, was measured. The cross-copolymer of the Example of the present invention has a low C-set value (67%) This indicates a good high temperature elastic recovery of the cross-copolymer of the present invention. Further, it is also possible to improve the C-set value and to lower the hardness, by blending it with a plasticizer. Further, a composition with a polypropylene showed no deformation by heat treatment at 120° C. for 2 hours (a dumbbell was hanged in a gear oven and the deformation was observed), and thus showed high heat softening resistance.

On the other hand, the C-set value of the ethylene/styrene copolymer of the Comparative Example was 93%.

Divinylbenzene

The divinylbenzene (a mixed product of m-isomer and p-isomer) used in the following Examples 8 to 10, was manufactured by Aldrich Company (purity as divinylbenzene: 80%, a mixture of m-isomer and p-isomer, weight ratio of m-isomer:p-isomer=70:30, accordingly, the isomer purity of m-divinylbenzene is 70 weight %). In the following polymerization, when 1 ml (5.5 mmol as divinylbenzene) was employed per 400 ml of styrene, the amount of divinylbenzene corresponds to 1/640 of the amount of styrene by molar ratio.

Further, in the following Examples 11 to 13, m-divinylbenzene (isomer purity: at least 97%) manufactured by Asahi Kasei Fine Chem, was employed. In this case, the isomer purity is the proportion of m-divinylbenzene among o-, m- and p-divinylbenzene isomers.

EXAMPLE 8
Preparation of a Cross-Copolymerized Ethylene/Styrene/Divinylbenzene Copolymer Using rac-dimethylmethylenebis(4,5-benzo-1-indenyl) zirconium dichloride as a catalyst, the preparation was carried out as follows.

Polymerization was carried out by means of an autoclave having a capacity of 10 l and equipped with a stirrer and a jacket for heating and cooling.

4400 ml of toluene, 400 ml of styrene and 2.0 ml of divinylbenzene manufactured by Aldrich Company were charged and heated and stirred at an internal temperature of 70° C. About 200 l of nitrogen was bubbled to purge the interior of the system and the polymerization solution. 8.4 mmol of triisobutyl aluminum and 21 mmol, based on Al, of methyl alumoxane (PMAO-3A, manufactured by TOSOH AKZO K. K.) were added, and ethylene was immediately introduced. After the pressure was stabilized at 0.25 MPa (1.5 kg/cm$^2$G), from a catalyst tank installed above the autoclave, about 50 ml of a toluene solution having 8.4 μmol of rac-dimethylmethylenebis(4,5-benzo-1-indenyl) zirconium dichloride and 0.84 mmol of triisobutyl aluminum dissolved therein, was added to the autoclave. Polymerization (the first polymerization step) was carried out for 24 minutes while maintaining the internal temperature at 70° C. and the pressure at 0.25 MPa. At this stage, the flow volume of ethylene was about 100 l in a standard state. At the same time as heating of the polymerization solution was initiated, a part of the polymerization solution was sampled, and a polymer sample (8-A) of the first polymerization step was obtained by precipitation from methanol. Ethylene was introduced rapidly, and the internal pressure was brought to 1.1 MPa in 12 minutes. In the second polymerization step, the polymerization temperature was maintained within an internal temperature range of from 97° C. to 105° C. The second polymerization step was carried out for a total of 18 minutes while maintaining the pressure at 1.1 MPa.

After completion of the polymerization, the obtained polymer solution was introduced in small portions into a large amount of a methanol solution which was vigorously stirred, to recover the polymer. This polymer was dried in air at room temperature for one day, and then, dried under vacuum at 80° C. until change in weight was no longer observed. 784 g of the polymer (8-C) was obtained.

The polymerization conditions in the respective Examples were summarized in Table 9.

The analytical results of the polymers obtained in the respective Examples are shown in Table 10.

TABLE 9

Polymerization Conditions

| | | | | | | | First polymerization step (main chain polymerization step) | | | |
|---|---|---|---|---|---|---|---|---|---|---|
| Ex. | Catalyst μmol | MAO mmol * | St ml | DVB ml (mmol) | Toluene ml | Et pressure MPa | Polymerization temperature ° C. | Et flow volume l | Polymerization time (min.) | St conversion (%) in first polymerization step % |
| Ex. 8 | 8.4 | P;21 | 400 | 2.0 ml Note 1 (11 mmol) | 4400 | 0.25 | 70 | About 100 | 24 | 40 |
| Ex. 9 | 8.4 | P;16.8 | 400 | 0.5 ml Note 1 (2.8 mmol) | 4400 | 0.25 | 70–80 | About 100 | 57 | 35 |
| Ex. 10 | 21 | P;21 | 800 | 1.0 ml Note 1 (5.5 mmol) | 4000 | 0.13 | 70 | About 70 | 120 | 62 |
| Ex. 11 | 8.4 | P;16.8 | 400 | 0.73 g Note 2 (5.4 mmol) | 4400 | 0.25 | 70–80 | About 150 | 44 | 53 |
| Ex. 12 | 8.4 | P;16.8 | 400 | 0.73 g Note 2 (5.4 mmol) | 4400 | 0.25 | 70–80 | About 200 | 91 | 65 |
| Ex. 13 | 8.4 | P;21 | 400 | 0.73 g Note 2 (5.4 mmol) | 4400 | 0.25 | 80–85 | About 250 | 117 | 72 |

| Second polymerization step (cross chain polymerization step) | | | | Final St |
|---|---|---|---|---|
| Et pressure MPa | Polymerization temperature ° C. | Et consumption amount l | Polymerization time (min.) | conversion (%) Note 3 |
| 1.1 | 97–105 | About 200 | 18 | 66 |
| 1.1 | 85–102 | About 300 | 52 | 60 |
| 1.1 | 70–83 | About 250 | 60 | 82 |
| 1.1 | 92–104 | About 270 | 52 | 79 |
| 1.1 | 91–103 | About 220 | 79 | 79 |
| 1.1 | 80–95 | About 170 | 28 | 89 |

P;PMAO (manufactured by Toso Fine Chem)
Note 1: Divinylbenzene manufactured by Aldrich Company, divinylbenzene purity: 80% (mixture of m-isomer and p-isomer, weight ratio of m-isomer:p-isomer = 70:30, isomer purity of m-divinylbenzene: 70%)
Note 2: Metadivinylbenzene manufactured by Asahi Kasei Fine Chem (m-DVB, isomer purity of m-divinylbenzene: at least 97%)
Note 3: Final St conversion (%); ratio of the amount of styrene monomer finally converted to polymer through first and second polymerization steps, to the amount of styrene monomer initially charged.

TABLE 10

Polymerization Results

| Ex. | Polymers | Yield 1) g | Styrene content mol % | Mw/10⁴ | Mw/Mn | Glass transition temperature ° C. | Melting point ° C. | Heat of crystal fusion J/g |
|---|---|---|---|---|---|---|---|---|
| Ex. 8 | 8-A | 286 | 22.1 | 17.8 | 2.5 | −20 | 42 | 4 |
|  | 8-B | 498 | 5.8 | — | — | — | — | — |
|  | 8-C | 784 | 10.6 | (17.4) | (2.9) | −21 | 97 | 57 |
| Ex. 9 | 9-A | 250 | 21.3 | 15.5 | 2.2 | −19 | 44 | 5 |
|  | 9-B | 635 | 4.5 | — | — | — | — | — |
|  | 9-C | 885 | 8.2 | Unmeasurable | Unmeasurable | −19 | 105 | 63 |
| Ex. 10 | 10-A | 610 | 42.9 | 14.9 | 2.4 | 17 | 92* | 19* |
|  | 10-B | 623 | 7.7 | — | — | — | — | — |
|  | 10-C | 1233 | 20.1 | (12.7) | (2.5) | −23, −16 | 80 | 30 |
| Ex. 11 | 11-A | 405 | 19.6 | 17.3 | 2.5 | −19 | 47 | 8 |
|  | 11-B | 565 | 5.1 | — | — | — | — | — |
|  | 11-C | 970 | 10.2 | Unmeasurable | Unmeasurable | −20 | 103 | 58 |
| Ex. 12 | 12-A | 530 | 17.8 | 20.2 | 2.8 | −20 | 51 | 10 |
|  | 12-B | 447 | 3.4 | — | — | — | — | — |
|  | 12-C | 977 | 10.1 | Unmeasurable | Unmeasurable | −21 | 109 | 53 |
| Ex. 13 | 13-A | 651 | 15.4 | 17.3 | 2.8 | −22 | 60 | 11 |
|  | 13-B | 326 | 6.2 | — | — | — | — | — |
|  | 13-C | 977 | 11.9 | Unmeasurable | Unmeasurable | −21 | 112 | 49 |

A value of polymer A (such as 8-A) was determined from a polymer obtained by sampling a part of a polymerization solution at the end of first polymerization step.
Polymer B (such as 8-B) is a copolymer obtained in second polymerization step (cross chain polymerization step) (including a copolymer component formed during raising an ethylene pressure).
Polymer C (such as 8-C) is a cross-copolymer finally obtained through the first and second polymerization steps.
Yield and styrene content of polymer B were determined from weight balance of polymer A and polymer C.
*DSC measurement, results of 1st run.
Mw or Mw/Mn in the brackets ( ) is a reference value.

In Table 10, in addition to the polymer (such as 8-A) obtained in the first polymerization step and the cross-copolymer i.e. the polymer (such as 8-C) finally obtained through the second polymerization step, the weight and the composition of the polymer (such as 8-B) polymerized in the second polymerization step are also shown as determined from weight balance.

EXAMPLES 9 AND 10

Under the conditions shown in Table 9, polymerization and post treatment were carried out in the same manner as in Example 8.

EXAMPLES 11 TO 13

Under the conditions shown in Table 9, polymerization and post treatment were carried out in the same manner as in Example 8. However, the divinylbenzene employed was m-divinylbenzene (isomer purity: at least 97%) manufactured by Asahi Kasei Fine Chem.

The cross-copolymerization conditions in these Examples satisfy the preferred conditions for obtaining cross-copolymers having good moldability, as follows.

Example 8 satisfies a condition that a) in the first and/or second polymerization step, the polymerization temperature is substantially always at least 80° C., preferably at least 85° C. and at most 160° C. during the polymerization.

Example 9 satisfies a condition that a) in the first and/or second polymerization step, the polymerization temperature is substantially always at least 80° C., preferably at least 85° C. and at most 160° C., during the polymerization.

Example 10 satisfies a condition that b) the aromatic vinyl compound content of the polymer obtained in the first polymerization step is at least 30 mol %, and its weight average molecular weight is at most 250,000.

Examples 11 to 13 satisfy conditions that a) in the first and/or second polymerization step, the polymerization temperature is substantially always at least 80° C., preferably at least 85° C. and at most 160° C., during the polymerization, and c) the diene to be employed is m-divinylbenzene having an isomer purity of at least 80 weight %, preferably at least 90 weight %.

By the gas chromatography analysis of the polymerization solution withdrawn upon completion of the first polymerization step, the amount of divinylbenzene remaining in the polymerization solution was obtained, and the amount of divinylbenzene consumed in the first polymerization step was obtained, From the value, the divinylbenzene content in the copolymer obtained in each first polymerization step was obtained, whereby it was about 0.06 mol % with polymer 8-A, about 0.03 mol % with polymer 9-A, about 0.04 mol % with polymer 10-A, about 0.03 mol % with polymer 11-A, about 0.04 mol % with polymer 12-A and about 0.03 mol % with polymer 13-A.

The structural index λ of the cross-copolymer obtained in each Example and the isotactic diad index m of the styrene unit/ethylene unit alternating structure, were obtained in accordance with the above formulae (i) and (ii), respectively. λ values of 8-A, 9-A, 11-A, 12-A and 13-A obtained in the first polymerization step were within a range of from 12 to 20, and λ value of 10-A was 39.

λ values of the cross-copolymers 8-C, 9-C, 11-C, 12-C and 13-C obtained through the second polymerization step were within a range of from 7 to 15, and λ value of 10-C was 24.

m value of each polymer was at least 0.95. The result of measurement of physical properties of the obtained polymers are shown in Table 11.

TABLE 11

|  | Example 8 | Example 9 | Example 11 | Example 12 | Example 13 |
|---|---|---|---|---|---|
| Kind of polymer | 8-C | 9-C | 11-C | 12-C | 13-C |
| Breaking elongation (%) | 510 | 633 | 483 | 443 | 520 |
| Yield strength (MPa) | Yield point was not observed | Yield point was not observed | Yield point was not observed | Yield point was not observed | Yield point was not observed |
| Breaking strength (MPa) | 26.1 | 20.9 | 25.0 | 22.7 | 27.0 |
| Elastic modulus in tension (MPa) | 20.2 | 35.0 | 24.2 | 29.1 | 17.2 |
| 100% modulus (MPa) | 5.0 | 6.0 | 5.2 | 5.7 | 4.0 |
| 300% modulus (MPa) | 8.9 | 7.4 | 9.4 | 9.4 | 8.6 |
| Hardness (Shore A) | 90 | 95 | 88 | 88 | 84 |
| Hardness (Shore D) | 35 | 42 | 37 | 37 | 32 |
| Total light transmittance (%) | 81 | 73 | 83 | 85 | 83 |
| Haze (%) | 11 | 18 | 11 | 11 | 12 |

It is evident that the cross-copolymerized styrene/ethylene/divinylbenzene copolymers of the Examples of the present invention have high mechanical strengths, high melting points and transparency. When the physical properties are compared with ethylene/styrene copolymers having the same compositions (styrene contents), they show higher melting points and show transparency equivalent to or higher than the ethylene/styrene copolymers. The melting points of the cross-copolymers of the Examples of the present invention have values substantially equal to or higher than ethylene/styrene copolymers having the same styrene contents as the cross chain component polymerized in the second polymerization step (the crossing step) Namely, cross-copolymer (8-C) obtained in Example 8 has an average styrene content of 10.6 mol %, and, nevertheless, its melting point is significantly higher than the ethylene/styrene copolymer having the same styrene content. Whereas, shore hardness A and D and the elastic modulus in tension of the cross-copolymer are substantially the same as the ethylene/styrene copolymer having the same styrene content, thus showing that the cross-copolymer has both heat resistance and softness. This is considered to be attributable to the effects of the main chain component (the component obtained in the first polymerization step) having a high styrene content and low crystallinity and the cross chain component (the component obtained in the second polymerization step) having a low styrene content and high crystallinity.

FIG. 9 shows the relation between the styrene content and the DSC melting point of the cross-copolymers obtained in Examples 8 to 13 of the present invention and the ethylene/styrene copolymers of the Comparative Examples.

The cross-copolymerized styrene/ethylene/diene copolymers obtained in Examples of the present invention, show good processability (MFR, i.e. MFR as measured under a load of 5 kg at 230° C. being at least 1.0 g/10 min and at most 50 g/10 min). (Table 12)

In general, there is a tendency that the processability (MFR) decreases as the final conversion of styrene (the conversion of the aromatic vinyl compound monomer species throughout all polymerization steps) increases. Such a decrease in the mold processability is observed particularly distinctly in a case where the aromatic vinyl compound content of the polymer obtained in the first polymerization step is less than 30 mol %. However, especially in a case where as a diene, m-divinylbenzene having an isomer purity of at least 80 weight %, preferably at least 90 weight % (Examples 11, 12 and 13) is used, even if a cross-copolymer is produced under such a condition that the final conversion of styrene (an aromatic vinyl compound) is at least 70%, the obtainable cross-copolymer has a characteristic of showing good processability (MFR, i.e. MFR as measured under a load of 5 kg at 230° C. being at least 1.0 g/10 min. and at most 50 g/10 min.). It is preferred to employ m-divinylbenzene for the production of a cross-copolymer from such a viewpoint that good mold processability (MFR) is obtainable while maintaining various physical properties such as heat resistance and transparency even under such a condition.

TABLE 12

| MFR (g/10 min.) | Ex. 8 8-C | Ex. 9 9-C | Ex. 10 10-C | Ex. 11 11-C | Ex. 12 12-C | Ex. 13 13-C |
|---|---|---|---|---|---|---|
| 230° C., load 5 kg | 1.5 | 2.3 | 1.9 | 1.2 | 1.2 | 1.1 |
| 230° C., load 10 kg | 6.7 | 8.8 | 5.9 | 5.2 | 6.0 | 4.0 |

The gel contents of the cross-copolymers obtained in Examples 8 to 13 were measured in accordance with ASTM D-2765-84. In the cross-copolymers in all of such Examples, the gel content was 0 weight % (the lower limit for measurement: 0.1 weight %), whereby it is evident that the cross-copolymers of the present invention have extremely low gel contents or crosslinking degrees.

By the X-ray diffraction, a crystal structure derived from ethylene chains was confirmed with the cross-copolymers of Examples 8 to 13 of the present invention.

The brittle temperatures of the cross-copolymers in Examples of the present invention were measured in accordance with JIS K-6723 and K-7216. As a result, each of cross-copolymers 8-C, 9-C, 11-C, 12-C and 13-C, showed a brittle temperature of not higher than −60° C.

Figure 11:
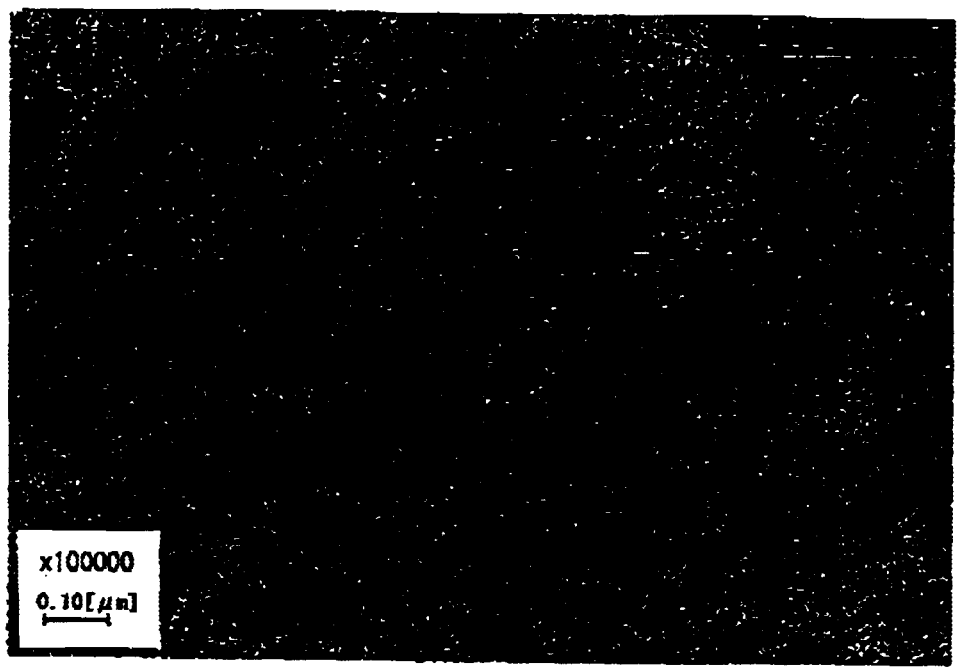
FIG. 11 is a transmission electron microscopic (TEM) photograph of a cross-copolymer.
Figure 12:
FIG. 12 is a TEM photograph of an ethylene/styrene copolymer composition of Comparative Example 7.

FIG. 11 shows a transmission electron microscopic (TEM) photograph of the cross-copolymer obtained in Example 8, and FIG. 12 shows a TEM photograph of the ethylene/styrene copolymer composition of Comparative Example 7.

In the case of the ethylene/styrene copolymer composition, copolymer portions (white portions) having a low styrene content and copolymer portions (black portions) having a relatively high styrene content are phase-separated in sizes of a few microns, and crystalline lamella (white needle crystal) is present only inside of the copolymer regions having a low styrene content. This result indicates low compatibility of ethylene/styrene copolymers having different compositions from each other.

Whereas, in the cross-copolymer, the portions (white portions) having a low styrene content and the portions (black portions) having a relatively high styrene content are both finely distributed in sizes of about 0.1 μm or smaller. Further, crystalline lamella (white needle crystal) is present substantially at the interface, and it is also observed in high styrene regions, and thus it takes a specific structure bridging both phases.

EXAMPLES 14 to 19 and COMPARATIVE EXAMPLE 9

In accordance with the blend ratios shown in Table 13, copolymer compositions were obtained, and by the following method, C-set and heat resistance were measured.

Measurement of C-Set

Using Brabender Plasti-Corder (PLE 331 model, manufactured by Brabender Company), the polymer was melted and then kneaded in a blend ratio as shown in Table 13 at 200° C. at 60 rpm for 10 minutes to obtain a sample. The sample was press-molded, and the physical properties were measured. Further, in accordance with JIS K6262, a high temperature compression permanent deformation (C-set) after heat treatment under pressure at 70° C. for 24 hours, was measured (Table 13). The heat resistance was evaluated by heat treatment of a dumbbell obtained by press molding (the dumbbell was hanged in a gear oven at 120° C. for two hours, and the deformation was observed).

The cross-copolymers of Examples of the present invention have low C-set values (65%). This indicates a good elastic recovery under a high temperature condition of the cross-copolymers of the present invention. Further, the heat resistance is also relatively good. Further, it is possible to improve the C-set value or to lower the hardness by blending the copolymer with a plasticizer.

On the other hand, the C-set value of the composition (Comparative Example 9) comprising ethylene/styrene copolymers having different compositions, is poor at 100%, and the heat resistance is also poor.

The composition comprising the cross-copolymer, a polyolefin (polyethylene) and a plasticizer showed a good C-set value and high heat resistance (Examples 18 and 19).

TABLE 13

|  |  | Ex. 14 | Ex. 15 | Ex. 16 | Ex. 17 | Ex. 18 | Ex. 19 | Comp. Ex. 9 |
|---|---|---|---|---|---|---|---|---|
| Blend ratio | Cross-copolymer | 8-C 100 parts | 9-C 100 parts | 11-C 100 parts | 12-C 100 parts | 12-C 100 parts | 12-C 100 parts | — |
|  | Et-St copolymer | — | — | — | — | — | — | R-1:50 parts + R-6:50 parts |
|  | High density polyethylene 7000F | — | — | — | — | 50 parts | 20 parts | — |
|  | Plasticizer NS-100 (Naphthene type oil | — | — | — | — | 50 parts | 50 parts | — |
| Physical property | Breaking elongation (%) | — | — | — | — | 780 | 720 | — |
|  | Breaking strength (MPa) | — | — | — | — | 12.6 | 10.0 | — |
|  | Hardness (Shore A) | — | — | — | — | 93 | 87 | — |
|  | Stabilizer (Irganox 1010) | 0.3 part | 0.3 part | 0.3 part | 0.3 part | 0.3 part | 0.3 part | 0.3 part |
|  | C-set (%) | 69 | 65 | 65 | 68 | 49 | 53 | 100 |
|  | Heat resistance (120° C., 2 hours) | ○ | ○ | ○ | ○ | ⊙ | ⊙ | X |

○: Not melted, but shrinkage observed.
⊙: Not melted, and no change in shape observed.
X: Melted and dropped.

INDUSTRIAL APPLICABILITY

According to the present invention, a cross-copolymerized olefin/styrene/diene copolymer excellent in mechanical properties, high temperature characteristics, compatibility and transparency, and industrially excellent processes for the production of such a cross-copolymer and its composition, are presented.

The entire disclosures of Japanese Patent Application No. 11-258618 filed on Sep. 13, 1999, Japanese Patent Application No. 2000-184053 filed on Jun. 20, 2000, Japanese Patent Application No. 2001-044715 filed on Feb. 21, 2001, and Japanese Patent Application No. 2001-221247 filed on Jul. 23, 2001 including specifications, claims, drawings and summaries are incorporated herein by reference in their entireties.

What is a claim is:

1. A cross-copolymerized olefin/aromatic vinyl compound/diene copolymer characterized in that it is obtained by using an olefin/aromatic vinyl compound/diene copolymer having an aromatic vinyl compound content of from 0.03 mol % to 96 mol %, a diene content of from 0.0001 mol % to 3 mol % and the rest being an olefin, and cross-copolymerizing it, wherein the aromatic vinyl compound content is different by at least 2 mol % as compared with the olefin/aromatic vinyl compound/diene copolymer prior to the cross-copolymerization.

2. The cross-copolymerized olefin/aromatic vinyl compound/diene copolymer according to claim 1, characterized in that it has an aromatic vinyl compound content of from 5 mol % to 50 mol %, a diene content of from 0.0001 mol % to 3 mol % and the rest being ethylene or at least two types of olefins including ethylene, and it has a crystal structure derived from an ethylene chain structure, wherein the aromatic vinyl compound content and at least one of the melting point such that the heat of crystal fusion as measured by DSC is at least 10 J/g and at most 150 J/g, satisfies the following relation:

$(5 \leq St \leq 15)$ $-3 \cdot St + 125 \leq Tm \leq 140$ $(15 < St \leq 50)$ $80 < Tm \leq 140$ where Tm is the melting point (° C.) such that the heat of crystal fusion is at least 10J/g and at most 150 J/g, and St is the aromatic vinyl compound content (mol %).

3. A process for producing a cross-polymerized olefin/aromatic vinyl compound/diene copolymer, characterized in that the production is carried out by employing a polymerization process of at least two steps comprising, as a first polymerization step (main chain polymerization step), carrying out copolymerization of an aromatic vinyl compound monomer, an olefin monomer and a diene monomer by means of a coordination polymerization catalyst to synthesize an olefin/aromatic vinyl compound/diene copolymer, and then, as a second polymerization step (crossing step) under polymerization conditions different therefrom, carrying out polymerization in the coexistence of this olefin/aromatic vinyl compound/diene copolymer and at least an olefin and an aromatic vinyl compound monomer by means of a coordination polymerization catalyst.

4. The process according to claim 3, wherein the amount of the diene used in the first polymerization step is from 1/50000 to 1/100 (molar ratio) of the amount of the aromatic vinyl compound monomer.

5. The process according to claim 3, wherein the polymerization solution obtained by the first polymerization step is used for a polymerization step of the second or subsequent polymerization step without separation and recovery of the olefin/aromatic vinyl compound/diene copolymer.

6. A cross-copolymerized olefin/aromatic compound/diene copolymer having an aromatic vinyl compound content of from 0.03 mol % to 96 mol %, a diene content of from 0.0001 mol % to 3 mol % and the rest being an olefin, obtained by the process as defined in claim 3.

7. The cross-copolymerized olefin/aromatic compound/diene copolymer according to claim 1 or 6, characterized in that the olefin is ethylene or at least two types of olefins including ethylene.

8. The cross-copolymerized olefin/aromatic compound/diene copolymer according to claim 1 or 6, characterized in that the aromatic vinyl compound is styrene.

9. The cross-copolymerized olefin/aromatic compound/diene copolymer according to claim 1 or 6, characterized in that the diene is one of o-divinylbenzene, p-divinylbenzene and m-divinylbenzene or a mixture thereof.

10. The cross-copolymerized olefin/aromatic compound/diene copolymer according to claim 1 or 6, wherein the diene is m-divinylbenzene having an isomer purity of at least 80 weight %.

11. The cross-copolymerized olefin/aromatic compound/diene copolymer according to claim 1 or 6, characterized in that MFR as measured under a load of 5 kg at 200° C. is at least 0.02 g/10 min. and at most 100 g/10 min., or MFR as measured under a load of 5 kg at 230° C. is at least 1.0 g/min. and at most 50 g/10 min.

12. The cross-copolymerized olefin/aromatic compound/diene copolymer according to claim 1 or 6, characterized in that the gel content is less than 10 is weight %.

13. The cross-copolymerized olefin/aromatic compound/diene copolymer according to claim 1 or 6, characterized in that in a molded product of 1 mm in thickness, it has a total light transmittance of at least 75% and/or a haze of at most 30%.

14. The process according to claim 3, characterized in that the coordination polymerization catalyst to be used in the first polymerization step and the second polymerization step is a single site coordination polymerization catalyst.

15. The process according to claim 3, characterized in that the coordination polymerization catalyst to be used in the first polymerization step and the second polymerization step is a single site coordination polymerization catalyst comprising a transition metal compound represented by the following general formula (1) and a cocatalyst:

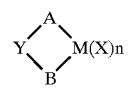

General fomula (1)

wherein

A and B are independently a group selected from an unsubstituted or substituted benzoindenyl group, an unsubstituted or substituted cyclopentadienyl group, an unsubstituted or substituted indenyl group, or an unsubstituted or substituted fluorenyl group;

Y is a methylene group, a silylene group, an ethylene group, a germilene group or a boron residue, which has bonds to A and B and which further has hydrogen or a group containing a $C_{1-20}$ hydrocarbon (this group may have from 1 to 3 nitrogen, boron, silicon, phosphorus, selenium, oxygen or sulfur atoms), as a substituent, the substituents may be the same or different from one another, and Y may have a cyclic structure such as a cyclohexylidene group or a cyclopentylidene group;

each X is independently hydrogen, a halogen, a $C_{1-15}$ alkyl group, a $C_{6-10}$ aryl group, a $C_{8-12}$ alkylaryl group, a silyl group having a $C_{1-4}$ hydrocarbon substituent, a $C_{1-10}$ alkoxy group, or an amide group having hydrogen or a $C_{1-22}$ hydrocarbon substituent, and n is an integer of 0, 1 or 2; and M is zirconium, hafnium or titanium.

16. The process according to claim 15, characterized in that at least one of A and B in the general formula (1) is an unsubstituted or substituted benzoindenyl group, or an unsubstituted or substituted indenyl group.

17. A molded product obtained by molding the cross-copolymerized olefin/aromatic vinyl compound/diene copolymer as defined in claim 1 or 6.

18. A film, a laminated, or a multi-layered film comprising the cross-copolymerized olefin/aromatic vinyl compound/diene copolymer as defined in claim 1 or 6.

19. A polymer composition comprising the cross-copolymerized olefin/aromatic vinyl compound/diene copolymer as defined in claim 1 or 6.

20. A composition comprising the cross-copolymerized olefin/aromatic vinyl compound/diene copolymer as defined in claim 1 or 6, and a polyolefin, and/or a plasticizer.

21. A composition comprising the cross-copolymerized olefin/aromatic vinyl compound/diene copolymer as defined in claims 1 or 6 and a filler.

22. A molded product of the composition as defined in claim 19.

23. A molded product of the composition as defined in claim 20.

24. A molded product of the composition as defined in claim 21.

25. The cross-copolymerized olefin/aromatic compound/diene copolymer according to claim 1 or 6, characterized in that in a molded product of 1 mm in thickness, it has a total light transmittance of at least 70% and/or a haze of at most 30%.

* * * * *

UNITED STATES PATENT AND TRADEMARK OFFICE
CERTIFICATE OF CORRECTION

PATENT NO. : 6,803,422 B2
DATED : October 12, 2004
INVENTOR(S) : Arai et al.

It is certified that error appears in the above-identified patent and that said Letters Patent is hereby corrected as shown below:

<u>Title page,</u>
Item [30], Foreign Application Priority Data, should read:

--     (30)     Foreign Application Priority Data

Sep. 13, 1999   (JP)   .................     11-258618
        Jun. 20, 2000   (JP)   ................ 2000-184053
        Feb. 21, 2001   (JP)   .................2001-044715
        Jul. 23, 2001    (JP)   ................ 2001-221247 --

Signed and Sealed this

Eleventh Day of January, 2005

JON W. DUDAS
*Director of the United States Patent and Trademark Office*